United States Patent
Tanaka et al.

(10) Patent No.: US 11,144,920 B2
(45) Date of Patent: Oct. 12, 2021

(54) AUTOMATIC TRANSACTION APPARATUS

(71) Applicant: Hitachi-Omron Terminal Solutions, Corp., Tokyo (JP)

(72) Inventors: Shuuji Tanaka, Tokyo (JP); Hisao Ogata, Tokyo (JP)

(73) Assignee: HITACHI-OMRON TERMINAL SOLUTIONS, CORP., Tokyo (JP)

( * ) Notice: Subject to any disclaimer, the term of this patent is extended or adjusted under 35 U.S.C. 154(b) by 376 days.

(21) Appl. No.: 16/007,440

(22) Filed: Jun. 13, 2018

(65) Prior Publication Data

US 2018/0300720 A1    Oct. 18, 2018

(30) Foreign Application Priority Data

Apr. 14, 2017 (JP) .............................. JP2017-080765

(51) Int. Cl.
    *G06Q 20/40*    (2012.01)
    *G06Q 20/10*    (2012.01)
    *G07F 19/00*    (2006.01)

(52) U.S. Cl.
CPC ....... *G06Q 20/401* (2013.01); *G06Q 20/1085* (2013.01); *G07F 19/20* (2013.01); *G06Q 2220/00* (2013.01)

(58) Field of Classification Search
CPC ............. G06Q 20/401; G06Q 20/1085; G06Q 2220/00; G07F 19/20
See application file for complete search history.

(56) References Cited

U.S. PATENT DOCUMENTS

| | | | |
|---|---|---|---|
| 6,253,997 B1* | 7/2001 | Inaoka et al. | |
| 6,768,975 B1* | 7/2004 | Gill et al. | |
| 2011/0137797 A1* | 6/2011 | Stals et al. | |
| 2013/0024375 A1* | 1/2013 | Choudhuri et al. | |
| 2015/0278818 A1* | 10/2015 | Horgan et al. | |

FOREIGN PATENT DOCUMENTS

| | | |
|---|---|---|
| JP | 2001-126098 A | 5/2011 |
| WO | WO2017/033321 A1 | 3/2017 |

OTHER PUBLICATIONS

Office Action issued in corresponding Japanese Patent Application No. 2017-080765 dated Jan. 12, 2021, with English machine translation.

* cited by examiner

*Primary Examiner* — James D Nigh
*Assistant Examiner* — Yin Y Choi
(74) *Attorney, Agent, or Firm* — Foley & Lardner LLP

(57) ABSTRACT

Provided is a highly reliable automatic transaction apparatus. This automatic transaction apparatus comprises a control unit which generates transaction data related to a transaction, and generates a command for payout, deposit or remittance based on the transaction data, and a first device which detects an abnormality of the control unit based on a command sent from the control unit according to an input from a device that is different from the control unit, wherein the first device sends the command to a second device that is different from the first device when the first device determines that an abnormality of the control unit is not detected based on a command sent from the control unit.

16 Claims, 27 Drawing Sheets

AUTOMATIC TRANSACTION APPARATUS

TECHNICAL FIELD

The present invention relates to an automatic transaction apparatus and, for instance, can be suitably applied to an ATM (Automated Teller Machine) which performs transactions based on operations of users.

BACKGROUND ART

In recent years, cases in which malware enters an ATM control unit of an automatic transaction apparatus such as an ATM and performs an unauthorized payout of an unsubstantiated transaction, or divulges important information such as the card number, are increasing overseas. This kind of malware was conventionally installed in an ATM control unit via a physical medium such as a USB (Universal Serial Bus) memory or a CD-ROM (Compact Disc Read Only Memory), but network intrusive cases where a targeted email attached with malware enters a bank network and the malware enters the ATM from the bank network are increasing. In the foregoing case, because malware is downloaded to the ATM as legitimate software, there are cases where even white list-type anti-malware software is unable to effectively prevent the malware, and malware countermeasures are becoming difficult.

As means for resolving the foregoing problem, PTL 1 discloses the following response method. In payout transactions, the paper currency processing unit receives the payout amount established in the transaction from the card reader via encrypted communication on the one hand, and receives a payout command for paying out the designated amount from the application which controls the paper currency processing unit on the other hand. The paper currency processing unit can prevent the unauthorized payout based on malware by performing payout processing only in response to a payout command by comparing the two pieces of amount information that were received.

Moreover, in deposit transactions, the card reader receives the amount of counted paper currency from the paper currency processing unit via encrypted communication on the one hand, and receives transaction data for performing the transaction of the designated deposit amount from the application which controls the card reader on the other hand. Subsequently, the card reader compares the two pieces of amount information that were received and causes the IC card (integrated circuit card) to issue an electronic signature or a message authentication code only to the matching transaction data. It is thereby possible to prevent the malware from concluding a deposit transaction of an amount that is greater than the amount of paper currency placed in the paper currency processing unit.

CITATION LIST

Patent Literature

[PTL 1] International Publication No. 2017/033321

SUMMARY OF THE INVENTION

Problems to be Solved by the Invention

Nevertheless, based on the method described in PTL 1, even if it is possible to prevent the malware, which entered the ATM control unit of the automatic transaction apparatus, from sending a payout command of an unsubstantiated transaction to the paper currency processing unit, there is a problem in that the ATM control unit will still contain the malware.

The present invention was devised in view of the foregoing points, and an object of this invention is to propose a highly reliable automatic transaction apparatus capable of detecting an abnormality in the control unit of the automatic transaction apparatus and taking countermeasures.

Means to Solve the Problems

In order to achieve the foregoing object, the automatic transaction apparatus of the present invention comprises a control unit which generates transaction data related to a transaction, and generates a command for payout, deposit or remittance based on the transaction data, and a first device which detects an abnormality of the control unit based on a command sent from the control unit according to an input from a device that is different from the control unit, wherein the first device sends the command to a second device that is different from the first device when the first device determines that an abnormality of the control unit is not detected based on a command sent from the control unit.

Moreover, in the present invention, the automatic transaction apparatus comprises a control unit which generates a command for payout or deposit based on transaction data related to a transaction, a deposit/payout processing unit which performs processing of payout or deposit based on a command generated by the control unit, and a device which is capable of detecting an abnormality of the control unit, wherein, after a transaction is concluded, the control unit generates a command for instructing the deposit/payout processing unit to perform processing of the transaction, and sends the command to the device, and wherein the device outputs an abnormality of the control unit upon detecting an abnormality of the control unit based on the command.

Moreover, in the present invention, the automatic transaction apparatus comprises a control unit which generates a command for payout or deposit based on transaction data related to a transaction, a deposit/payout processing unit which performs processing of payout or deposit based on a command generated by the control unit, and a device which is capable of detecting an abnormality of the control unit, wherein, after a transaction is concluded, the control unit generates a command for instructing the deposit/payout processing unit to perform processing of the transaction, and sends the command to the device, and wherein the device performs prescribed abnormality countermeasure processing upon detecting an abnormality of the control unit based on the command.

Moreover, in the present invention, the automatic transaction apparatus comprises a control unit which generates transaction data related to a transaction, and generates a command for payout, deposit or remittance based on the transaction data, and a first device which includes a first input unit for inputting information from a device that is different from the control unit and a second input unit which can be used by a user for inputting information to the automatic transaction apparatus, wherein the first device detects an abnormality of the control unit based on a command sent from the control unit according to an input of one or both of the first input unit and the second input unit, and, upon detecting an abnormality, externally outputs the abnormality of the control unit.

According to the foregoing configuration, because a device that is different from the control unit detects the abnormality of the control unit, it is possible to take measures promptly upon the occurrence of an abnormality.

Advantageous Effects of the Invention

According to the present invention, it is possible to realize a highly reliable automatic transaction apparatus.

DESCRIPTION OF EMBODIMENTS

An embodiment of the present invention is now explained in detail with reference to the appended drawings.

(1) First Embodiment (1-1) Configuration of Conventional Automatic Transaction System 1

Figure 1:
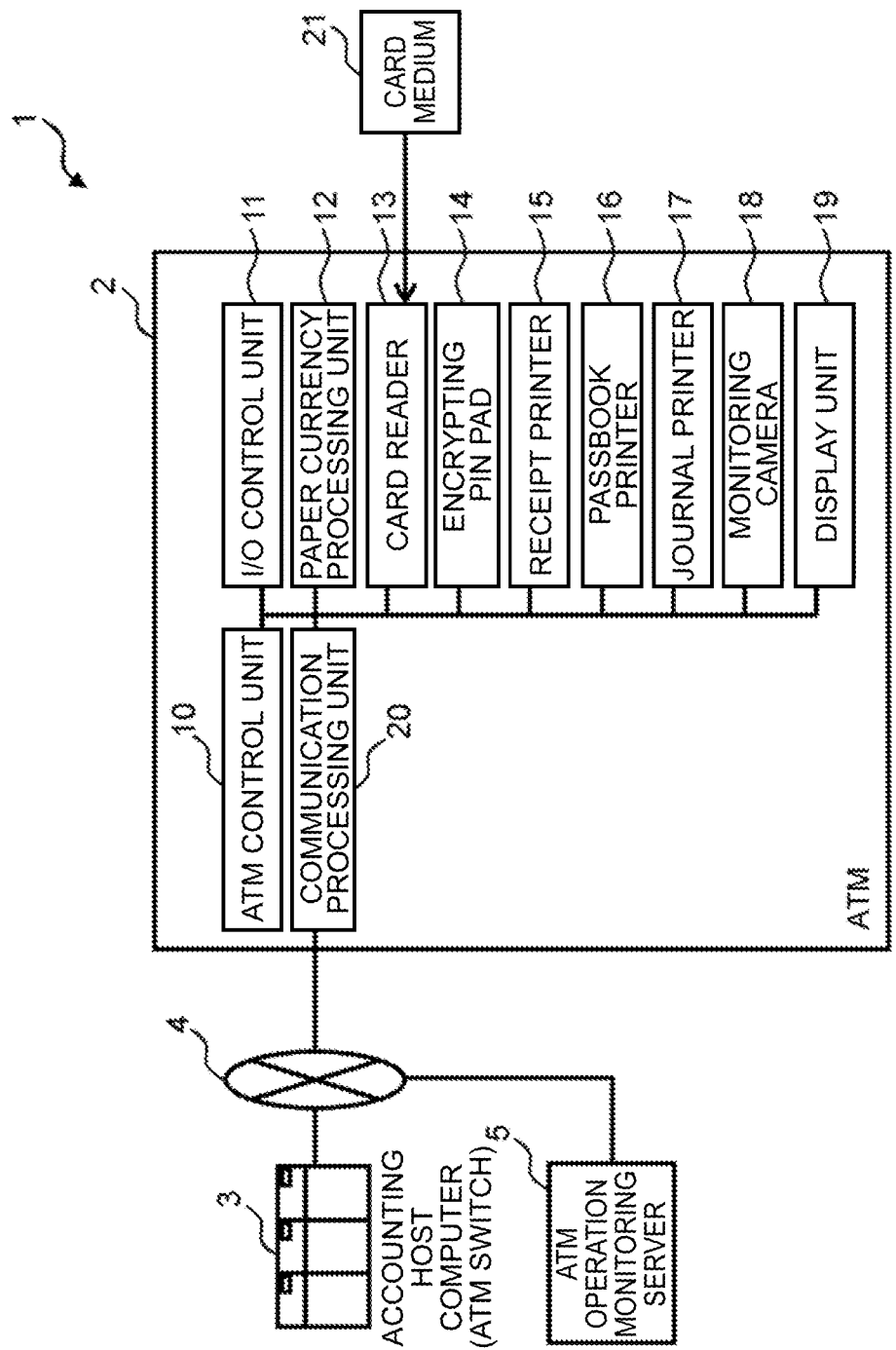
FIG. 1 is a diagram showing a configuration of a conventional automatic transaction system.

Before explaining the automatic transaction system according to this embodiment, the configuration of a conventional automatic transaction system 1 is foremost explained with reference to FIG. 1.

The automatic transaction system 1 is configured by connecting one or more ATMs 2 and an accounting host computer 3 via a wide area network 4 such as a WAN (Wide Area Network). Furthermore, an ATM operation monitoring server 5 which monitors an operational status, such as whether the ATM 2 has been shut down or is being operated, is connected to the ATM 2 via the wide area network 4.

(Configuration of ATM 2)

The ATM 2 is an automatic transaction apparatus which performs transactions of cash deposit/payout according to the user's operation. The ATM 2 is configured by comprising an ATM control unit 10 which governs the operational control of the overall ATM 2, an I/O (Input/Output) control unit 11 which performs the display lamp control of the front panel of the ATM 2 and detects the opening/closing of the front panel, a paper currency processing unit 12 which counts the paper currencies deposited in a deposit/payout port provided at the front of the ATM 2 and transfers and stores the counted paper currencies to and in a cashbox, or removes the paper currencies to be paid out from the cashbox and transfers the removed paper currencies to the deposit/payout port, a card reader 13 which reads information recorded on a card medium 21, such as a cash card, from the card medium 21 which is required for performing transactions in the ATM 2, an encrypting pin pad 14 which includes a numeric keypad for inputting the personal identification number and other information and which encrypts the input personal identification number and other information, a receipt printer 15 which is a printer for printing transaction receipts, a passbook printer 16 which is a printer for printing on passbooks, a journal printer 17 which records the logs of the ATM transactions, a security monitoring camera 18 which takes a face photo of a user, a display unit 19 which displays information related to the deposit transaction, and a communication processing unit 20 which communicates with an accounting host computer 3. A deposit/payout port is a port used by the user of the ATM 2 for removing paper currency from the ATM 2 or depositing paper currency in the ATM 2, and normally the deposit/payout port is closed with a cover (shutter). Note that this embodiment explains a case where a magnetic stripe card is used as the card medium 21. Moreover, the display unit 19 may also be a display operation unit which receives operations from the user, and may also have the functions of the encrypting pin pad 14.

Figure 2:
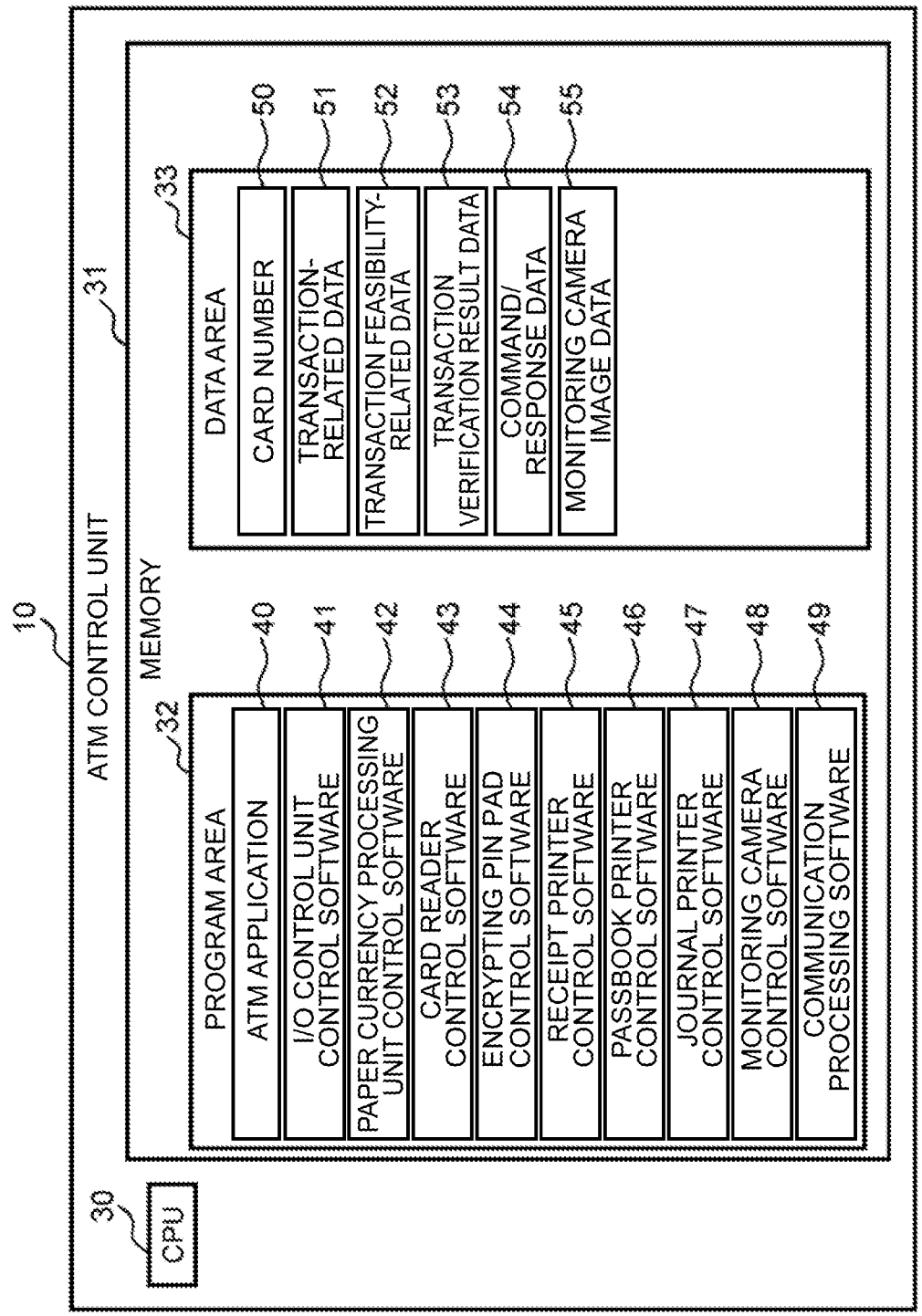
FIG. 2 is a diagram showing a schematic configuration of a conventional ATM control unit.

FIG. 2 is a diagram showing a schematic configuration of the ATM control unit 10. As shown in FIG. 2, the ATM control unit 10 adopts a micro computer configuration comprising information processing resources such as a CPU (Central Processing Unit) 30 and a memory 31. The CPU 30 is a processor which governs the operational control of the overall ATM control unit 10, and the memory 31 is configured, for instance, from a semiconductor memory.

The storage area of the memory 31 is managed by being divided into a program area 32 and a data area 33. The program area 32 stores an ATM application 40 which controls the overall transactions of the ATM 2. The program area 32 additionally stores (I/O control unit control software 41, paper currency processing unit control software 42, card reader control software 43, encrypting pin pad control software 44, receipt printer control software 45, passbook printer control software 46, journal printer control software 47, monitoring camera control software 48 and communication processing software 49) for respectively controlling the I/O control unit 11, the paper currency processing unit 12, the card reader 13, the encrypting pin pad 14, the receipt printer 15, the passbook printer 16, the journal printer 17, the monitoring camera 18 and the display unit 19.

Moreover, the data area 33 stores data required for the deposit/payout transaction in the ATM 2. Specifically, a card number 50, transaction-related data 51, transaction feasibility-related data 52, transaction verification result data 53, command/response data 54, monitoring camera image data 55 and the like are stored in the data area 33. The card number 50 is information for identifying the user's account, such as the bank account number or the credit card number, which is stored in the card medium 21, and is acquired from the card medium 21 by the card reader 13, and stored in the memory 31 of the ATM control unit 10.

The transaction-related data 51 is transaction data to be sent to the accounting host computer 3, a message authentication code (MAC: Message Authentication Code) of the transaction data, and related data to be used for generating the transaction data and the transaction data MAC. The transaction data stored in the transaction-related data 51 is, for instance, information related to the transaction based on the user's input such as the payout amount and the deposited amount, and in particular includes information related to the transaction amount. Moreover, the transaction data may also include information such as the card number 50.

The transaction feasibility-related data 52 is data of a result of the accounting host computer 3 referring to the bank account balance and the credit information and determining whether the transaction may be concluded regarding the transaction data sent from the ATM 2, and a corresponding message authentication code, and is generated by the accounting host computer 3. The accounting host computer 3 is also referred to as an ATM switch, a higher-level device of the ATM 2, or an external computer of the ATM 2.

The transaction verification result data 53 is data of a result of the card medium 21 verifying the transaction feasibility data sent from the accounting host computer 3 to the card medium 21 (for instance, the IC card). The command/response data 54 is data to be used in the communication with the devices (11 to 20) connected to the ATM control unit 10. The monitoring camera image data 55 is image data and time data sent from the monitoring camera control software 48.

Figure 3:
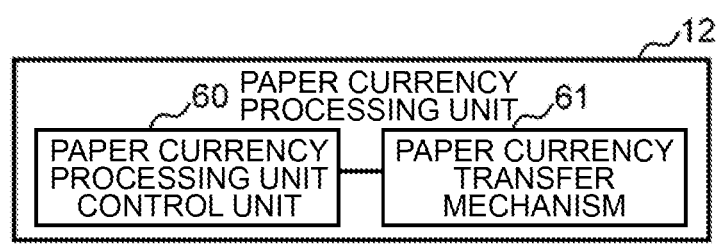
FIG. 3 is a diagram showing a functional configuration of a conventional paper currency processing unit.

FIG. 3 is a diagram showing a functional configuration of the paper currency processing unit 12. As shown in FIG. 3, the paper currency processing unit 12 is configured by comprising a paper currency processing unit control unit 60 and a paper currency transfer mechanism 61.

The paper currency processing unit control unit 60 is hardware with a function of controlling the paper currency transfer mechanism 61, and exchanging commands and responses with the ATM control unit 10. The paper currency transfer mechanism 61 is hardware with a function of transferring the paper currencies from a cashbox, which is storing the paper currencies in a vault, and paying out such paper currencies to the user of the ATM 2, and transferring the paper currencies deposited by the user in the paper currency deposit/payout port of the ATM 2 to a temporary cashbox and counting the deposited paper currencies, and transferring the paper currencies stored in the temporary cashbox to the cashbox in the vault after the deposit transaction is concluded. Note that the paper currency processing unit control unit 60 may also have a function of counting the denomination and number of paper currencies transferred during the payout, and a function of counting the denomination and number of paper currencies transferred during the deposit.

Figure 4:
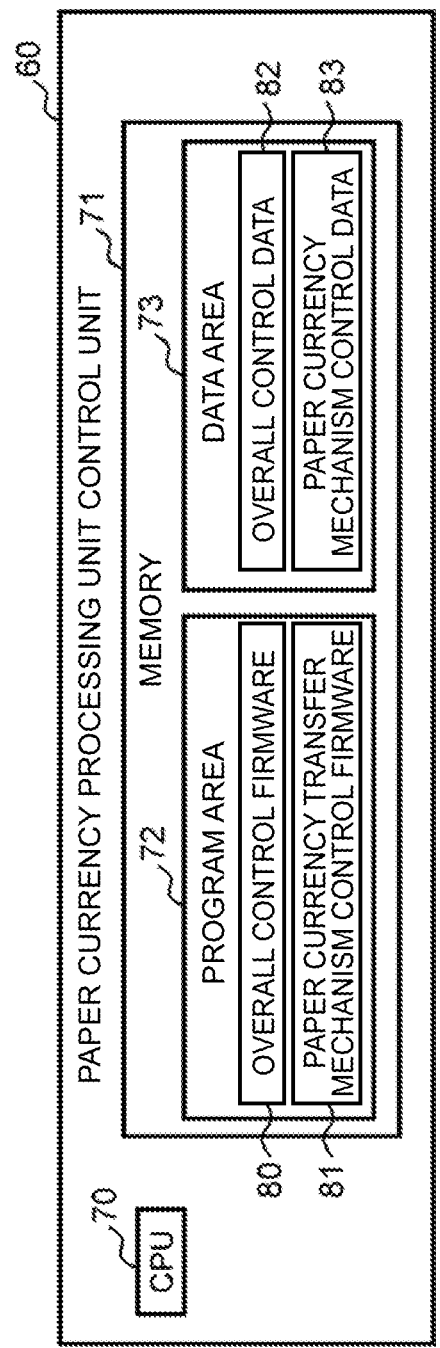
FIG. 4 is a diagram showing a schematic configuration of a conventional paper currency processing unit control unit.

FIG. 4 is a diagram showing a schematic configuration of the paper currency processing unit control unit 60. The paper currency processing unit control unit 60 has a micro computer configuration comprising information processing resources such as a CPU 70, and a memory 71. The CPU 70 is a processor which governs the operational control of the overall paper currency processing unit control unit 60, and the memory 71 is configured, for example, from a semiconductor memory.

The storage area of the memory 71 is managed by being divided into a program area 72 and a data area 73. The program area 72 stores overall control firmware 80, paper currency transfer mechanism control firmware 81 and the like. The data area 73 stores overall control data 82, paper currency transfer mechanism control data 83 and the like.

The overall control firmware 80 is software with a function of controlling the communication with the ATM control unit 10, and controlling the paper currency transfer mechanism control firmware 81. Moreover, the paper currency transfer mechanism control firmware 81 is software with a function of controlling the paper currency transfer mechanism 61.

Moreover, the overall control data 82 is communication data of communications with the ATM control unit 10, and data (data area) used for controlling other control firmware. The paper currency transfer mechanism control data 83 is data used for controlling the paper currency transfer mechanism 61.

Note that, while not shown, the paper currency transfer mechanism 61 comprises a deposit/payout port which is used by the user of the ATM 2 for depositing or removing paper currencies, a cashbox (temporary stocker) for temporarily housing paper currencies during the transaction, and a cashbox for safekeeping paper currencies which is surrounded by a vault or the like.

Figure 5:
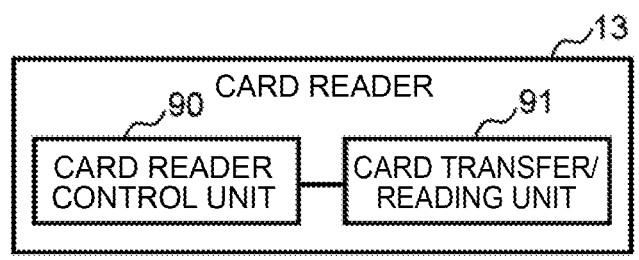
FIG. 5 is a diagram showing a functional configuration of a conventional card reader.

FIG. 5 is a diagram showing a functional configuration of the card reader 13. The card reader 13 is configured by comprising a card reader control unit 90, and a card transfer/reading unit 91.

The card reader control unit 90 is hardware with a communication function of controlling the card transfer/reading unit 91, and sending and receiving commands and responses to and from the ATM control unit 10. The card transfer/reading unit 91 is hardware with a function of transferring the card medium 21, which was inserted into the card reader 13 by the user of the ATM 2, to the reading unit, and transferring the card medium 21 from the reading unit and returning the card medium 21 to the user.

Note that the card reader 13 may be configured so that a card medium 21 such as a magnetic stripe card or an IC card is inserted therein, or configured so that a non-contact IC card or a smartphone or other communication equipment (for example, a portable terminal) equipped with a non-contact communication function is passed thereover, and is an example of a reading device which reads information from a storage medium such as the card medium 21.

Figure 6:
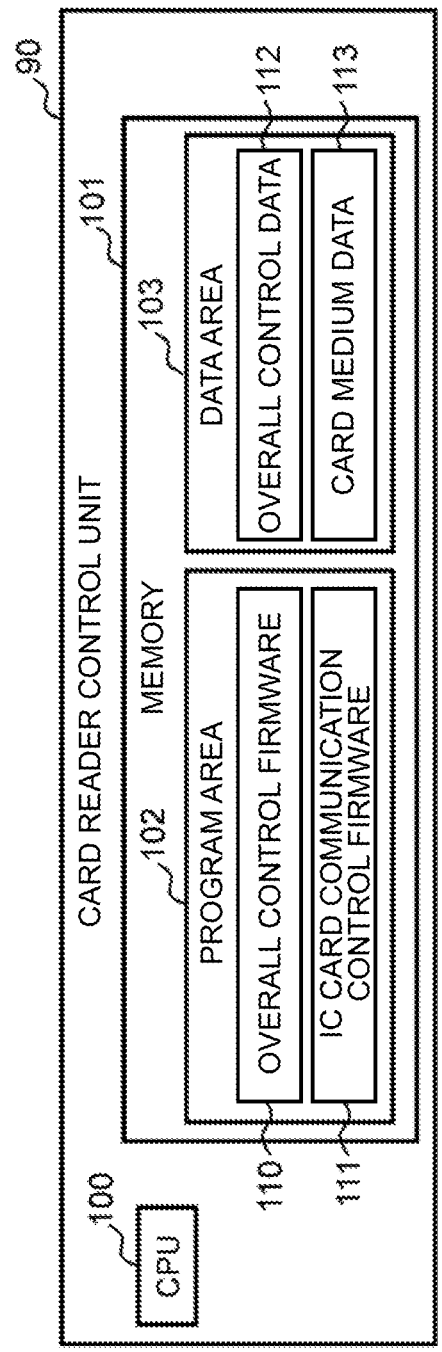
FIG. 6 is a diagram showing a schematic configuration of a conventional card reader control unit.

FIG. 6 is a diagram showing a schematic configuration of the card reader control unit 90. The card reader control unit 90 has a micro computer configuration comprising information processing resources such as a CPU 100, and a memory 101. The CPU 100 is a processor which governs the operational control of the overall card reader control unit 90, and the memory 101 is configured, for example, from a semiconductor memory.

The storage area of the memory 101 is managed by being divided into a program area 102 and a data area 103. The program area 102 stores overall control firmware 110, IC card communication control firmware 111 and the like. The data area 103 stores overall control data 112, card medium data 113 and the like.

The overall control firmware 110 is software with a function of controlling the communication with the ATM control unit 10, and controlling the card transfer/reading unit 91, and the IC card communication control firmware 111. The IC card communication control firmware 111 is software with a function of controlling the communication with the IC card.

The overall control data 112 is communication data of communications with the ATM control unit 10, and data (data area) used for controlling the IC card communication control firmware 111. The card medium data 113 is data that is read from or written into the card medium 21 such as an IC card or a magnetic card.

Figure 7:
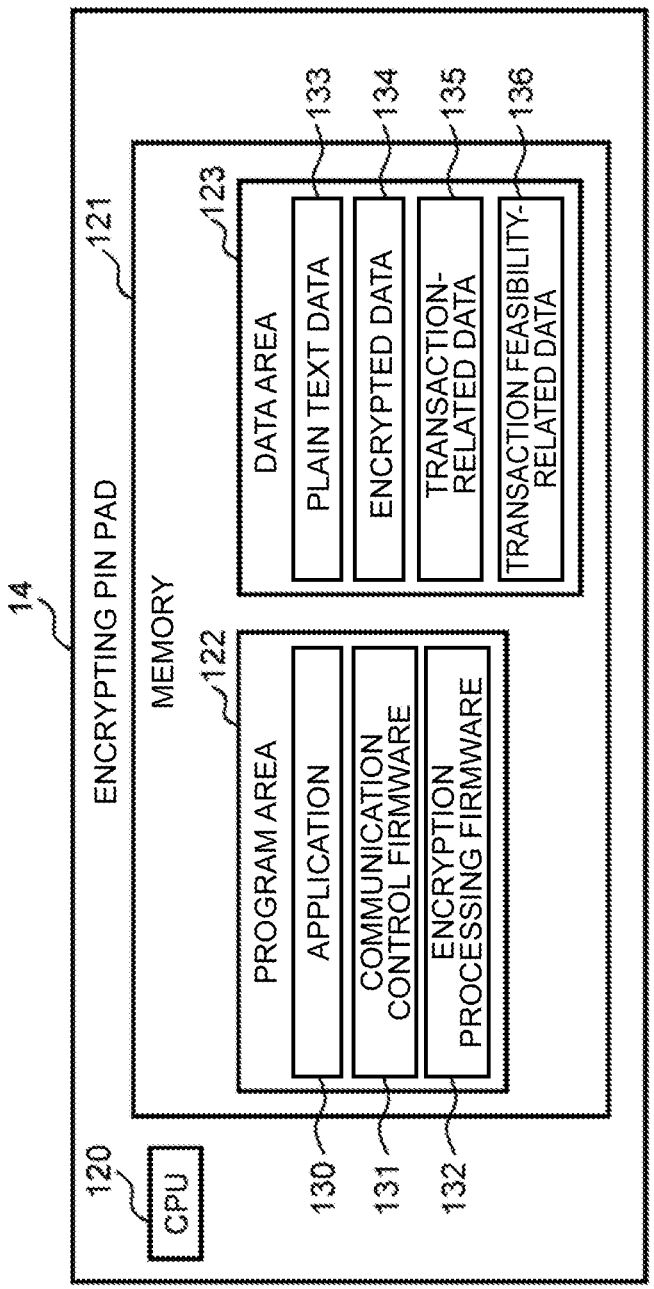
FIG. 7 is a diagram showing a schematic configuration of a conventional encrypting pin pad.

FIG. 7 is a diagram showing a schematic configuration of the encrypting pin pad 14. As shown in FIG. 7, the encrypting pin pad 14 has a micro computer configuration comprising information processing resources such as a CPU 120, and a memory 121. The CPU 120 is a processor which governs the operational control of the overall encrypting pin pad 14, and the memory 121 is configured, for example, from a semiconductor memory.

The storage area of the memory 121 is managed by being divided into a program area 122 and a data area 123. The program area 122 stores an application 130, communication control firmware 131, encryption processing firmware 132 and the like. The data area 123 stores plain text data 133, encrypted data 134, transaction-related data 135, transaction feasibility-related data 136 and the like.

The application 130 is firmware which controls the overall encrypting pin pad 14. Moreover, the communication control firmware 131 is firmware with a function of controlling the data communication between the encrypting pin pad 14 and the respective devices in the ATM 2. The encryption processing firmware 132 is firmware with an encryption processing function of verifying the transaction feasibility data sent from the ATM control unit 10, and generating a transaction data MAC (electronic signature, message authentication code or the like) in response to the transaction data sent from the ATM control unit 10.

The plain text data 133 is plain text data such as the payout amount and the transaction menu in a payout transaction that is input by pressing the keys of the encrypting pin pad 14. The encrypted data 134 is the personal identification number that is input by pressing the keys of the encrypting pin pad 14 and encrypted when output outside of the encrypting pin pad 14.

The transaction-related data 135 is data corresponding to the transaction-related data 51. In other words, as the transaction-related data 135, transaction data to be sent to the accounting host computer 3, a transaction data MAC corresponding to the transaction data, and related data used for generating the transaction data and the transaction data MAC are stored in the data area 123. The transaction feasibility-related data 136 is data corresponding to the transaction feasibility-related data 52. In other words, as the transaction feasibility-related data 136, transaction feasibility data indicating a result of the accounting host computer 3 referring to the bank account balance and the credit information and determining whether the transaction may be concluded, and a transaction feasibility data MAC (electronic signature, message authentication code or the like) corresponding to the transaction feasibility data are stored in the data area 123.

(Configuration of Accounting Host Computer 3)

Figure 8:
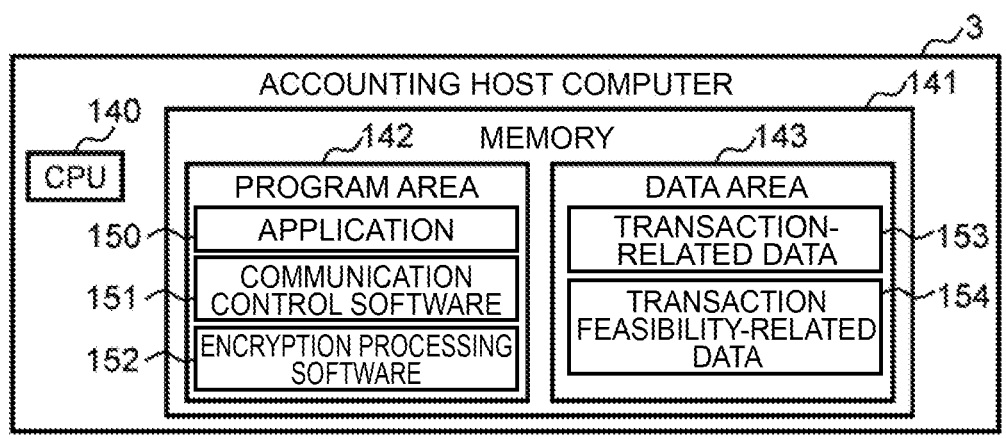
FIG. 8 is a diagram showing a schematic configuration of a conventional accounting host computer.

FIG. 8 is a diagram showing a schematic configuration of the accounting host computer 3. The accounting host computer 3 is a computer device with a function of storing and managing information related to the account and balance of the user of the ATM 2, and is configured by comprising information processing resources such as a CPU 140 which governs the operational control of the overall accounting host computer 3, and a memory 141.

The storage area of the memory 141 is managed by being divided into a program area 142 and a data area 143. The program area 142 stores an application 150, communication control software 151, encryption processing software 152 and the like. The data area 143 stores transaction-related data 153, transaction feasibility-related data 154 and the like.

The application 150 is software which controls the overall accounting host computer 3. Moreover, the communication control software 151 is software with a function of controlling the data communication between the accounting host computer 3 and the respective ATMs 2. The encryption processing software 152 is software with an encryption processing function of verifying the message authentication code sent from the ATM 2, and newly generating a message authentication code. The encryption processing software 152 may also be realized with hardware.

The transaction-related data 153 is data corresponding to the transaction-related data 51. The transaction feasibility-related data 154 is data corresponding to the transaction feasibility-related data 52. In other words, as the transaction feasibility-related data 154, transaction feasibility data indicating a result of the accounting host computer 3 referring to the bank account balance and the credit information and determining whether the transaction may be concluded, and message authentication code data corresponding to the transaction feasibility data are stored in the data area 143.

(Configuration of ATM Operation Monitoring Server 5)

Figure 9:
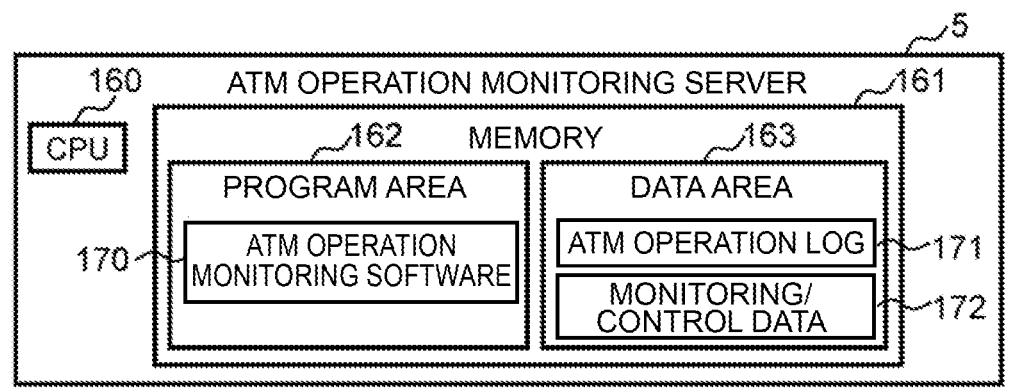
FIG. 9 is a diagram showing a schematic configuration of a conventional ATM operation monitoring server.

FIG. 9 is a diagram showing a schematic configuration of the ATM operation monitoring server 5. The ATM operation monitoring server 5 is a computer device with a function of monitoring and managing the operational status of the ATM 2, and is configured by comprising information processing resources such as a CPU 160 which governs the operational control of the overall ATM operation monitoring server 5, and a memory 161.

The storage area of the memory 161 is managed by being divided into a program area 162 and a data area 163. The program area 162 stores, for example, ATM operation monitoring software 170. The data area 163 stores an ATM operation log 171, monitoring/control data 172 and the like.

The ATM operation monitoring software 170 has a function of monitoring the operational status of the ATM 2, and enabling the remote shutdown of the ATM 2 and other remote operations. The ATM operation log 171 is data storing the operational status of the ATM 2. The monitoring/control data 172 is data for the ATM operation monitoring server 5 to send commands to the ATM 2.

(Payout Transaction Processing in Automatic Transaction System 1)

The flow of conventional payout transaction processing using a magnetic stripe card as the card medium 21 is now explained with reference to FIG. 10.

In the ensuing explanation, let it be assumed that pre-processing such as encryption key exchange for performing encrypted communication between the accounting host computer 3 and the ATM 2 has been completed. Furthermore, even in cases where a challenge code or a response code using random numbers is required in the encrypted communication for preventing a replay attack, the flow of such data is omitted. A "replay attack" is an attack of performing unauthorized processing by a third party storing previously sent data, and resending the stored data.

Moreover, let it be assumed that the card medium 21 has been inserted into the card reader 13 by the user of the ATM 2. Moreover, explanation of the processing flow of identity verification/authentication processing using a personal identification number or the like is also omitted.

Foremost, the card reader 13 reads the card number from the card medium 21, and stores the read card number as the card medium data 113 in the data area 103 (step S1). The card reader 13 thereafter sends the card number, which was stored as the card medium data 113 in the data area 103, to the ATM control unit 10 (step S2). The ATM control unit 10 receives the card number, and stores the received card number as the card number 50 in the data area 33 (step S3). Subsequently, the ATM control unit 10 sends the stored card number to the encrypting pin pad 14 (step S4). The encrypting pin pad 14 stores the sent card number as the plain text data 133 in the data area 123 (step S5). The reason why the card number is stored in the encrypting pin pad 14 is because one of the formats of encrypting and outputting the personal identification number requires the card number.

While the foregoing explanation is assuming a case of sending the card number as a plain text from the card reader 13 to the encrypting pin pad 14, the card number may also be sent in an encrypted state via encrypted communication for security. In the foregoing case, the encrypted card number stored in the encrypting pin pad 14 may be once stored in the encrypted data 134, and the card number may be decrypted with the function of the encryption processing firmware 132 in the encrypting pin pad 14 and stored as the plain text data 133 in the data area 123.

When the encrypting pin pad 14 is operated by the user of the ATM 2 and the payout amount of the transaction is input, the encrypting pin pad 14 sends the payout amount to the ATM control unit 10 (step S6). The ATM control unit 10 receives the sent payout amount, and stores the received payout amount as the transaction-related data 51 in the data area 33 (step S7).

Subsequently, the ATM control unit 10 generates transaction data by using the received card number and payout amount, and sends the transaction data to the encrypting pin pad 14 to assign a transaction data MAC to that transaction data (step S8). While the encrypting pin pad 14 is normally used for encrypting the personal identification number, the encrypting pin pad 14 is also used for performing encryption processing such as generating and verifying an electronic signature or a message authentication code corresponding to a transaction telegram by using its own encryption function.

The encrypting pin pad 14 receives the sent transaction data and stores the received transaction data as the transaction-related data 135 in the data area 123 (step S9). Subsequently, the encrypting pin pad 14 calculates the transaction data MAC and stores the calculation result as the transaction-related data 135 in the data area 123, and sends the transaction data MAC to the ATM control unit 10 (step S10). The ATM control unit 10 receives the transaction data MAC, and stores the received transaction data MAC as the transaction-related data 51 in the data area 33 (step S11). The ATM control unit 10 thereafter sends the transaction data MAC, together with the previously stored transaction data, to the accounting host computer 3 (step S12).

The accounting host computer 3 receives the transaction data and the transaction data MAC, and stores the received transaction data and transaction data MAC as the transaction-related data 153 in the data area 143 (step S13). The accounting host computer 3 verifies the legitimacy of the transaction data of the transaction-related data 153 by using the electronic signature or the message authentication code corresponding to that transaction data. Moreover, the accounting host computer 3 confirms the user's account balance and credit information, verifies the feasibility of the payout transaction based on the payout amount, account balance, and credit information, and thereby generates transaction feasibility data. Subsequently, the accounting host computer 3 generates a transaction feasibility data MAC (electronic signature, message authentication code or the like) corresponding to the transaction feasibility data, and stores the generated transaction feasibility data MAC as the transaction feasibility-related data 154 in the data area 143 (step S14). The accounting host computer 3 thereafter sends the transaction feasibility data and the corresponding transaction feasibility data MAC stored in the data area 143 to the ATM control unit 10 (step S15).

When the ATM control unit 10 receives the transaction feasibility data and the transaction feasibility data MAC sent from the accounting host computer 3, the ATM control unit 10 stores the received transaction feasibility data and transaction feasibility data MAC as the transaction feasibility-related data 52 in the data area 33, and additionally sends such data to the encrypting pin pad 14 (step S16).

When the encrypting pin pad 14 receives the transaction feasibility data and the transaction feasibility data MAC sent from the ATM control unit 10, the encrypting pin pad 14 stores the received transaction feasibility data and transaction feasibility data MAC as the transaction feasibility-related data 136 in the data area 123. Subsequently, the encrypting pin pad 14 calculates the transaction feasibility data MAC corresponding to the transaction feasibility data, verifies the legitimacy of the transaction feasibility data, and stores the verification result as the transaction feasibility-related data 136 (transaction feasibility data MAC verification result) in the data area 123 (step S17). The encrypting pin pad 14 thereafter reads the transaction feasibility data MAC verification result from the data area 123, and sends the transaction feasibility data MAC verification result to the ATM control unit 10 (step S18).

The ATM control unit 10 receives the transaction feasibility data MAC verification result sent from the encrypting pin pad 14, and stores the received transaction feasibility data MAC verification result as the transaction verification result data 53 in the data area 33 (step S19).

When the transaction feasibility data MAC verification result is correct and the transaction feasibility data indicates the conclusion of a transaction, the ATM control unit 10 determines that the transaction has been concluded and generates a paper currency payout command, and sends the generated paper currency payout command to the paper currency processing unit 12 (step S20). The paper currency payout command is a command for instructing the performance of the paper currency payout processing of fetching the required amount of cash from the cash cassette in the paper currency processing unit 12 and transferring the paper currencies to the deposit/payout port that can be accessed by the user of the ATM 2. When the paper currency processing unit 12 receives the paper currency payout command, the paper currency processing unit 12 performs the paper currency payout processing (step S21).

When the transaction feasibility data indicates the conclusion of a transaction, the ATM control unit 10 additionally generates a deposit/payout port shutter open command for opening the shutter which is blocking the deposit/payout port, and sends the generated deposit/payout port shutter open command to the paper currency processing unit 12 (step S22). When the paper currency processing unit 12 receives the deposit/payout port shutter open command, the paper currency processing unit 12 opens the shutter to enable the user of the ATM 2 to remove the paper currencies (step S23). Note that, when the transaction feasibility data does not indicate the conclusion of a transaction, a message is displayed on the display unit 19 to notify the user of the ATM 2 that the transaction could not be concluded. The flow of conventional payout transaction processing is as described above.

Here, a case where malware enters the ATM application 40 of the ATM control unit 10 and processing of sending an unauthorized paper currency payout command of an unsubstantiated transaction to the paper currency processing unit 12 may occur, for instance, in step S20 and step S22. In other words, the natural processing flow of the ATM control unit 10 is to generate a paper currency payout command based on the transaction feasibility data stored in the memory 31. This is guaranteed based on the legitimacy of the ATM application 40.

Nevertheless, if the legitimacy of the ATM application 40 is not ensured due to the inclusion of malware, an unauthorized paper currency payout command, which is not based on the transaction feasibility data, is sent to the paper currency processing unit 12. In the foregoing case, the unauthorized payout of paper currencies will be carried out upon falsification of the payout amount in the paper currency payout command, or sending of a paper currency payout command, which is completely unrelated to the transaction, to the paper currency processing unit 12.

Foregoing PTL 1 describes a method of preventing an unauthorized payout even when malware enters the ATM control unit by performing encrypted communication between the card reader and the paper currency processing unit. Nevertheless, in the foregoing case, similar to the encrypted paper currency payout command of a substantiated transaction, even if a deposit/payout port shutter open command of a substantiated transaction is encrypted and sent in step S22 and step S23, there is a possibility of another attack.

For example, the malware of the ATM control unit 10 blocks the encrypted deposit/payout port shutter open command to be sent to the paper currency processing unit 12, and, after the user of the ATM 2 walks away from the ATM 2, a malicious third party operates the malware of the ATM 2 using some kind of means, and sends the blocked deposit/payout port shutter open command to the paper currency processing unit 12 to fraudulently remove paper currencies. In the case of this kind of attack, even if the deposit/payout port shutter open command of a substantiated transaction is encrypted, it is not possible to prevent the foregoing attack.

Moreover, even if it is possible to prevent an unauthorized payout command from the malware that entered the ATM control unit 10, it would be unacceptable to leave the malware in the ATM control unit 10, and it is necessary for the ATM system to monitor whether the ATM control unit 10 is operating normally or abnormally, and, if there is any abnormality, it is necessary to immediately notify the abnormal status to the monitoring system existing at a higher level than the ATM 2.

Nevertheless, when referring to attacks based on malware and the like, there are cases where the malware itself or a malicious computer installed within the ATM 2 prevent the notification of an abnormality to a higher-level monitoring system. Moreover, when the malware itself enters from an internal network of the bank, there is a possibility that the higher-level monitoring system itself has already been taken over, and, even if an abnormality is notified to the ATM 2, the monitoring system may not necessarily be able to take proper measures.

Meanwhile, in the case of a deposit transaction, in addition to risks such as the fraudulent falsification of the deposited amount and the fraudulent falsification of the account number of the payee, there is a risk where, after a deposit transaction is concluded, a paper currency return command or a deposit/payout port shutter open command is fraudulently sent to the paper currency processing unit 12 by the malware, and the paper currencies placed in the ATM 2 are fraudulently returned. In order to explain the foregoing case, the flow of conventional deposit transaction processing is now explained with reference to FIG. 11.

(Deposit Transaction Processing in Automatic Transaction System 1)

The flow of conventional deposit transaction processing using a magnetic stripe card as the card medium 21 is now explained with reference to FIG. 11. In the deposit transaction processing, the processing of step S1 to step S5 and step S8 to step S19 of FIG. 10 in the payout transaction processing is the same. Step S6 and step S7, and step S20 to step S23, of FIG. 10 are respectively replaced with step S30 to step S33, and step S34 and step S35, in the deposit transaction processing. The differences are now mainly explained.

The ATM control unit 10 generates (the ATM application 40 generates via the paper currency processing unit control software 42) a deposited paper currency count command for counting the total amount of paper currencies placed in the ATM 2, and stores the generated deposited paper currency count command as the command/response data 54 in the data area 33. Subsequently, the ATM control unit 10 sends the stored deposited paper currency count command to the paper currency processing unit 12 (step S30). When the paper currency processing unit 12 receives the deposited paper currency count command, the paper currency processing unit 12 performs count processing of counting the paper currencies placed in the deposit/payout port provided at the front of the ATM 2, and storing the counted paper currencies in the temporary cashbox within the paper currency processing unit (step S31). Subsequently, the paper currency processing unit 12 sends the total amount of the counted paper currencies, or the number of paper currencies for each denomination, as the deposited paper currency count result to the ATM control unit 10 (step S32).

When the ATM control unit 10 receives the deposited paper currency count result, ATM control unit 10 stores the received deposited paper currency count result as the transaction-related data 51 in the data area 33 (step S33). Subsequently, the ATM control unit 10 generates transaction data for a deposition transaction by combining the transaction-related data 51 and the card number 50, and similarly stores the generated transaction data as the transaction-related data 51 in the data area 33, and sends the transaction data to the encrypting pin pad 14 (step S8 of FIG. 10). The processing of step S9 to step S19 of FIG. 10 is thereafter performed.

Subsequently, in the deposit transaction processing, when the transaction feasibility data MAC verification result received in step S19 is correct and the transaction feasibility data indicates the conclusion of a transaction, the ATM control unit 10 determines that the transaction has been concluded and generates (the ATM application 40 generates via the paper currency processing unit control software 42) a paper currency receipt command, and stores the generated paper currency receipt command as the command/response data 54 in the data area 33. Subsequently, the ATM control unit 10 sends the stored paper currency receipt command to the paper currency processing unit 12 (step S34). When the paper currency processing unit 12 receives the paper currency receipt command, the paper currency processing unit 12 performs paper currency receipt processing of transferring the paper currencies housed in the temporary cashbox to the cashbox surrounded by a vault or the like (step S35). The flow of conventional deposit transaction processing is as described above.

Here, for instance, if malware enters the ATM application 40 of the ATM control unit 10, in substitute for generating and sending a paper currency receipt command in step S34 of the conventional deposit transaction processing described above, there is a possibility that a paper currency return command and a deposit/payout port shutter open command are generated and sent to the paper currency processing unit 12 as shown in step S36 and step S38. Consequently, the paper currencies before receipt that are housed in the temporary cashbox are returned to the deposit/payout port based on the paper currency return command, and the deposit/payout port shutter is opened based on the deposit/payout port shutter open command, and paper currencies can thereby be removed. Moreover, if the ATM 2 is not equipped with a temporary cashbox, the paper currencies housed in the cashbox are removed and returned to the deposit/payout port. In the foregoing case, because the deposit transaction has already been completed, the user of the ATM 2 will walk away from the ATM 2 without any recognition of what happened. Subsequently, a malicious third party can operate the malware in the ATM 2 and acquire the paper currencies which were scheduled to be transferred to the cashbox based on the foregoing operations.

In the case of this kind of attack, no abnormality is notified to the accounting host computer 3. Moreover, if the recording of data indicating abnormalities in the transaction log stored in the ATM 2 is obstructed by the malware, no abnormality is notified to the ATM operation monitoring server 5. If the ATM control unit 10 has already been taken over by the malware, it would be difficult for the ATM control unit 10 to independently determine an abnormality.

Consequently, an abnormality will not be discovered until an operation referred to as a "detailed audit" of inspecting whether a prescribed number of paper currencies exists in the ATM 2 is performed, and there is a possibility that the ATM 2 will undergo continuous attack and suffered a huge damage. Thus, in the transaction processing of the ATM 2, in the event of an abnormality, it is necessary to immediately detect such abnormality and promptly execute countermeasures against such abnormal status.

Thus, in this embodiment, in cases where the application software or the control software in the ATM 2 is fraudulently falsified with malware, proposed is an automatic transaction system in which a device in the ATM 2 monitors the legitimacy of the command sent from the ATM control unit 10 so as to prevent attacks such as unauthorized payout processing and unauthorized deposit processing, and promptly notify an abnormal status of the ATM control unit 10 to the ATM monitoring system.

Furthermore, in cases where a device in the ATM 2 attempts to notify an abnormal status of the ATM control unit 10 to the ATM operation monitoring server or the security monitoring server but malware obstructs such notification or the foregoing server has previously been attacked and is not functionally normally, proposed is an automatic transaction system capable of detecting such abnormal status and taking subsequent measures.

Figure 12:
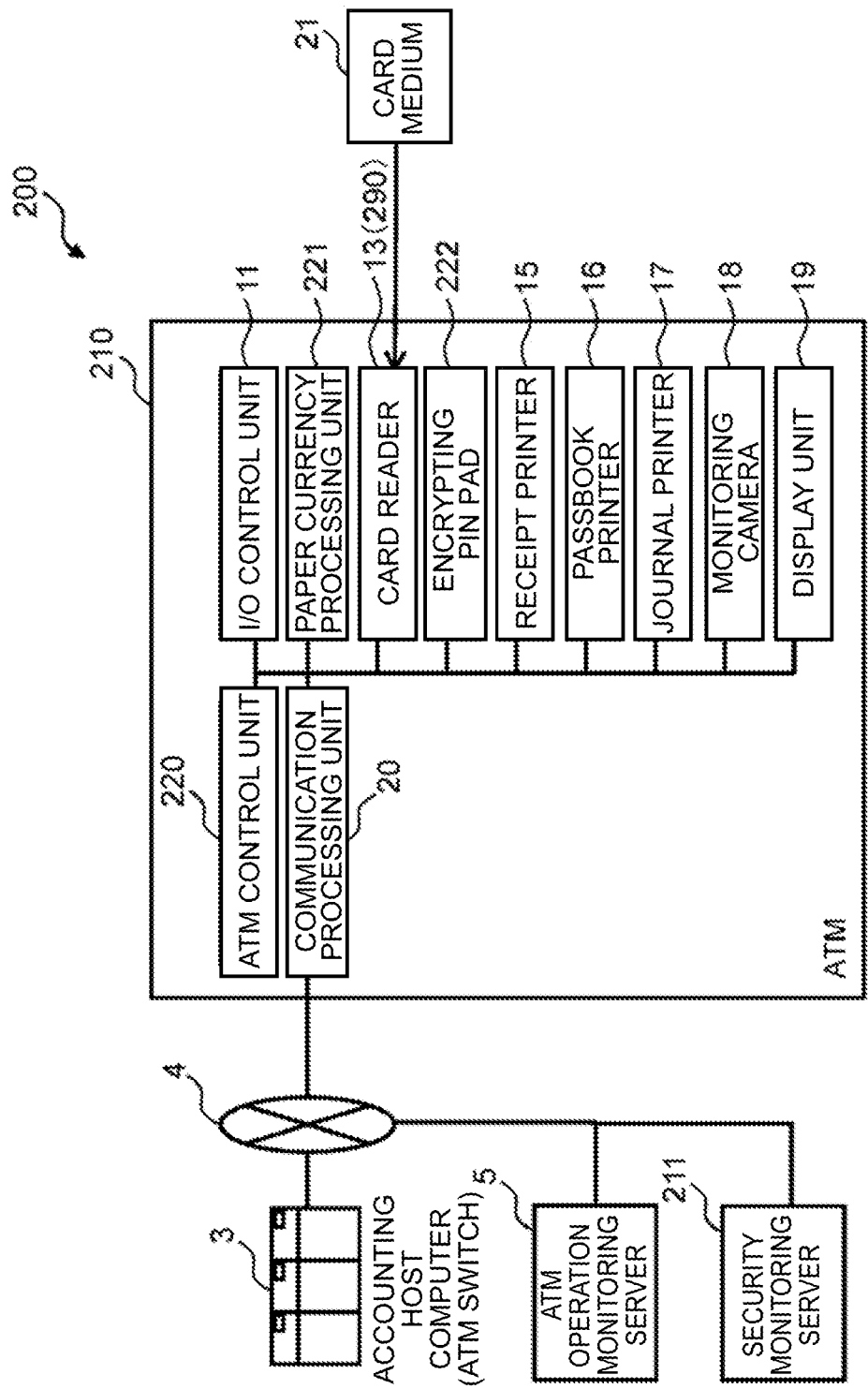
FIG. 12 is a diagram showing a configuration of an automatic transaction system according to the first embodiment.

(1-2) Configuration of Automatic Transaction System 200 According to First Embodiment In FIG. 12, reference numeral 200 shows the overall automatic transaction system according to this embodiment. The automatic transaction system 200 of this embodiment is configured in the same manner as the foregoing conventional automatic transaction system 1 other than the ATM 210 (ATM control unit 220, paper currency processing unit 221 and encrypting pin pad 222), and the security monitoring server 211. The same reference numeral is basically used for the same configuration, and the explanation thereof is omitted when appropriate.

(Configuration of ATM 210)

Figure 13:
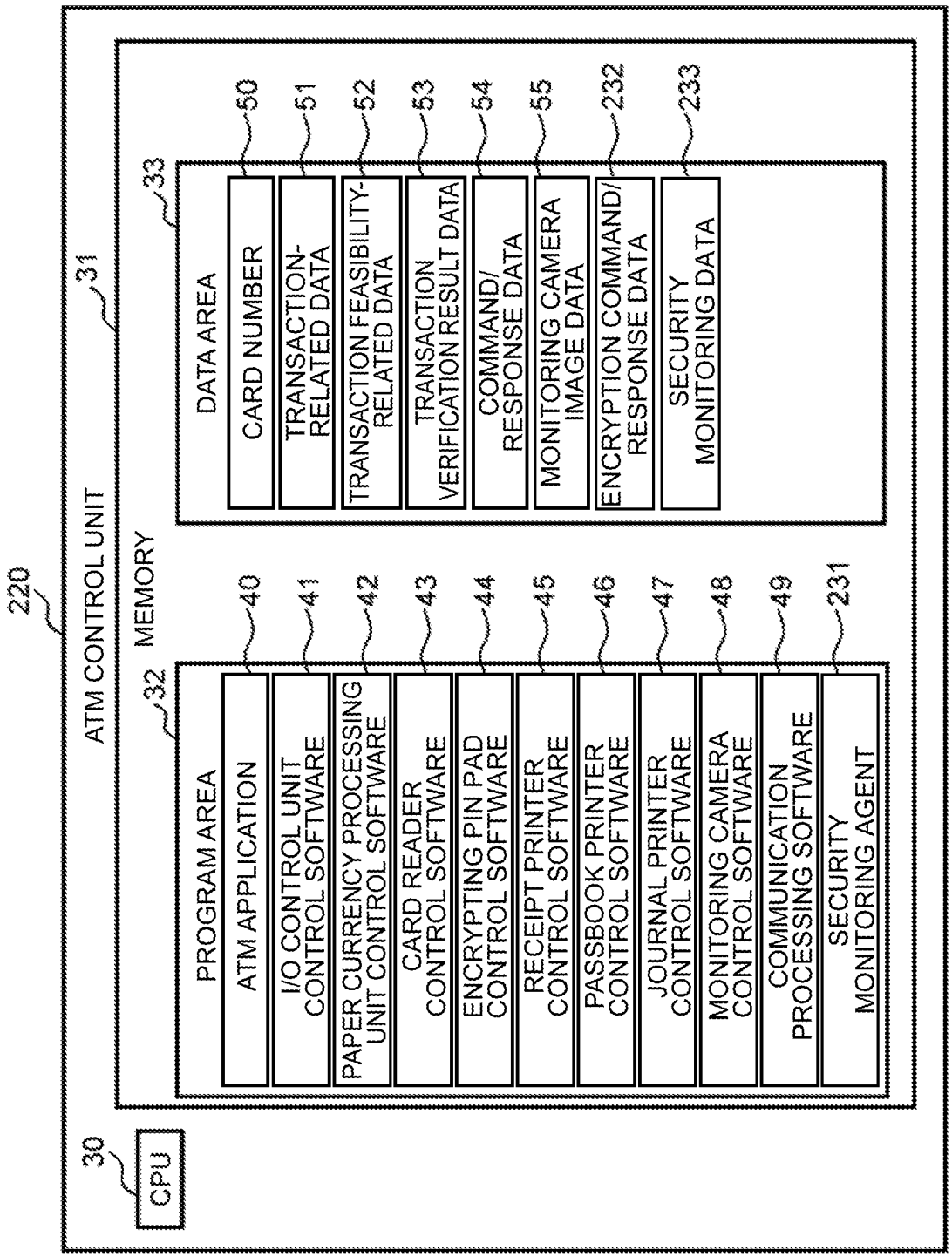
FIG. 13 is a diagram showing a schematic configuration of an ATM control unit according to the first embodiment.

FIG. 13 is a diagram showing a schematic configuration of the ATM control unit 220. The ATM control unit 220 is configured in the same manner as the conventional ATM control unit 10 other than the security monitoring agent 231 of the program area 32, and the encryption command/response data 232 and the security monitoring data 233 of the data area 33.

The security monitoring agent 231 is software for notifying the security monitoring server 211 of the abnormal status of the ATM control unit 220 which was sensed (detected) by a device in the ATM 210. The encryption command/response data 232 is data for sending and receiving encrypted commands and responses to and from the device in the ATM 210 via the ATM control unit 220. The security monitoring data 233 is data that is used upon notifying the abnormal status of the ATM control unit 220, which was detected by the device in the ATM 210, to the security monitoring server 211.

Figure 14:
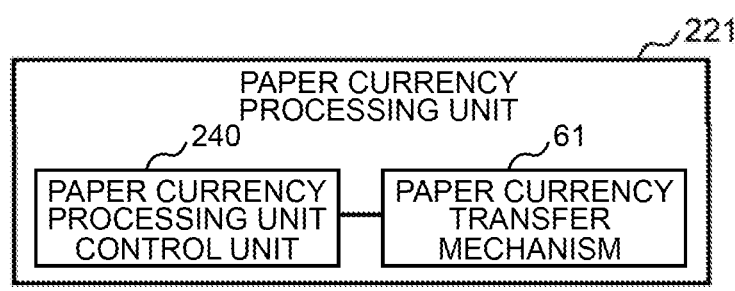
FIG. 14 is a diagram showing a functional configuration of a paper currency processing unit according to the first embodiment.

FIG. 14 is a diagram showing a functional configuration of the paper currency processing unit 221. As shown in FIG. 14, the paper currency processing unit 221 is configured from comprising a paper currency processing unit control unit 240 and a paper currency transfer mechanism 61. Note that the explanation of the functions of the paper currency processing unit 221, which are the same as the functions of the paper currency processing unit 12, is omitted.

Figure 15:
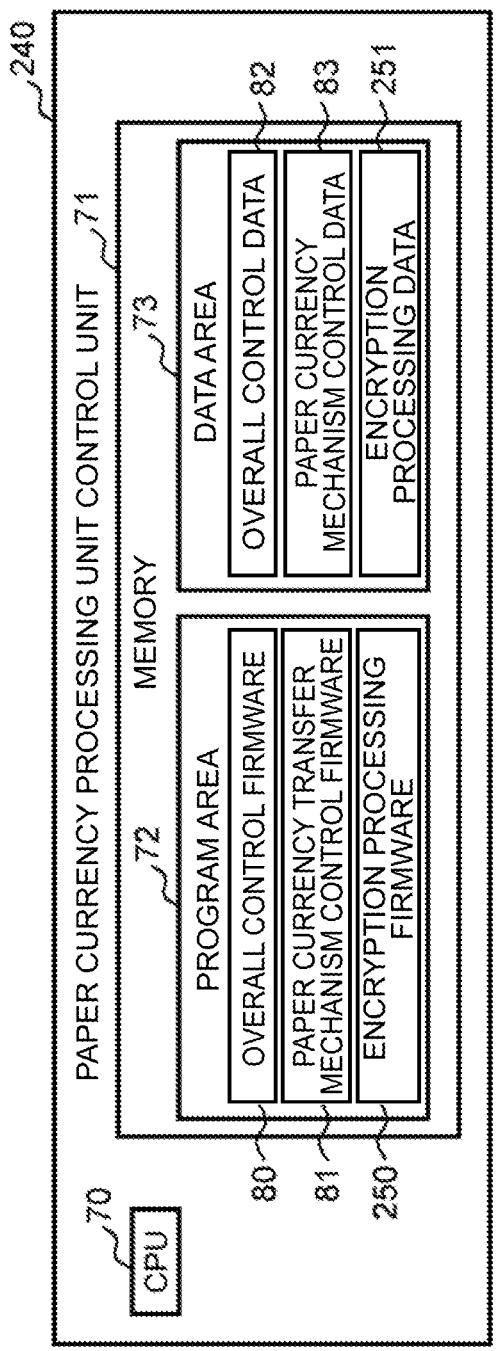
FIG. 15 is a diagram showing a schematic configuration of a paper currency processing control unit according to the first embodiment.

FIG. 15 is a diagram showing a schematic configuration of the paper currency processing unit control unit 240. The paper currency processing unit control unit 240 is configured in the same manner as the conventional paper currency processing unit 12 other than the encryption processing unit firmware 250 and the encryption processing data 251 stored in the memory 71 of the paper currency processing unit control unit 240.

The encryption processing unit firmware 250 is firmware with a function of encrypting the data output from the paper currency transfer mechanism 61 and decrypting the encrypted data sent from the ATM control unit 220, but may also be configured from hardware having an equivalent function. The encryption processing data 251 is processing data that is used during the encrypted communication with the ATM control unit 220, or other devices in the ATM 210. For example, the encryption processing data 251 is for generating and verifying electronic signature data or a message authentication code. Note that the overall control firmware 80 has a function of controlling the encryption processing unit firmware 250 in addition to conventional control.

Figure 16:
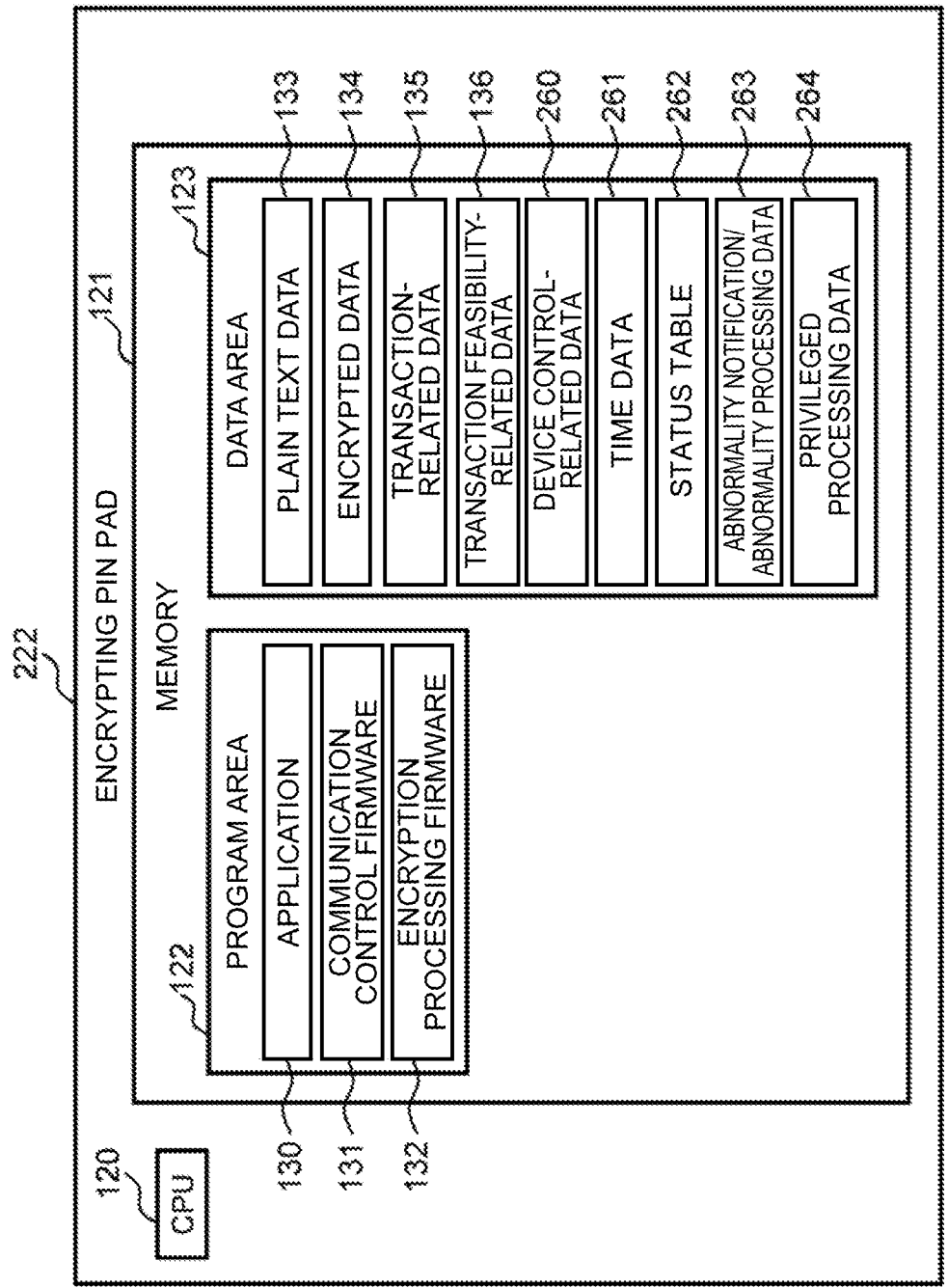
FIG. 16 is a diagram showing a schematic configuration of an encrypting pin pad according to the first embodiment.

FIG. 16 is a diagram showing a schematic configuration of the encrypting pin pad 222. The encrypting pin pad 222 is configured in the same manner as the conventional encrypting pin pad 14 other than device control-related data 260, time data 261, a status table 262, abnormality notification/abnormality processing data 263, and privileged processing data 264.

The device control-related data 260 is data that is used by the encrypting pin pad 222 for sending and receiving commands and responses to and from the ATM control unit 220, or data that is used for sending and receiving encrypted commands and responses to and from other devices in the ATM 210.

The time data 261 is data that indicates the time that the commands and responses were sent to and received from the ATM control unit 220, or other devices in the ATM 210. The status table 262 stores data indicating the status of transaction in the ATM 210, such as whether it is before or after the accounting host computer 3 has approved a payout transaction or a deposit transaction, data indicating the status of whether the ATM control unit 220 is operating normally or abnormally, and data indicating the status of the encrypting pin pad 222, such as whether the encrypting pin pad 222 is in a normal mode or a degradation mode according to the response from the security monitoring server 211.

In cases where the encrypting pin pad 222 detects an abnormality of the ATM control unit 220, the abnormality notification/abnormality processing data 263 is data that is used for notifying the abnormal status to the security monitoring server 211, or data from the security monitoring server 211 for instructing the measures to be taken against the abnormal status.

The privileged processing data 264 is, for instance, data that is used in cases where, when the encrypting pin pad 222 enters a degradation mode and is to be returned to the normal mode pursuant to the instruction from the security monitoring server 211, the encrypting pin pad 222 is caused to enter the privileged mode upon returning to the normal mode. For example, when the encrypting pin pad 222 is to enter the privileged mode by using a one-time password, the privileged processing data 264 is a challenge code required for issuing the one-time password, or data that is used by the encrypting pin pad 222 for verifying the issued one-time password.

(Configuration of Security Monitoring Server 211)

The security monitoring server 211 is a server which monitors the security status of the ATM 210, and, when a device in the ATM 210 detects an abnormality of the ATM control unit 220, receives abnormality detection information from the ATM 210. The security monitoring server 211 is a computer with a function of sending, when an abnormality is notified from the ATM 210, the security monitoring server 211, a function command of outputting an abnormality countermeasure order, such as operating the ATM 210 in a degradation mode, according to the contents of the abnormality detection information, or shutting down the ATM 210 in coordination with the ATM operation monitoring server 5 or directly shutting down the ATM 210.

Figure 17:
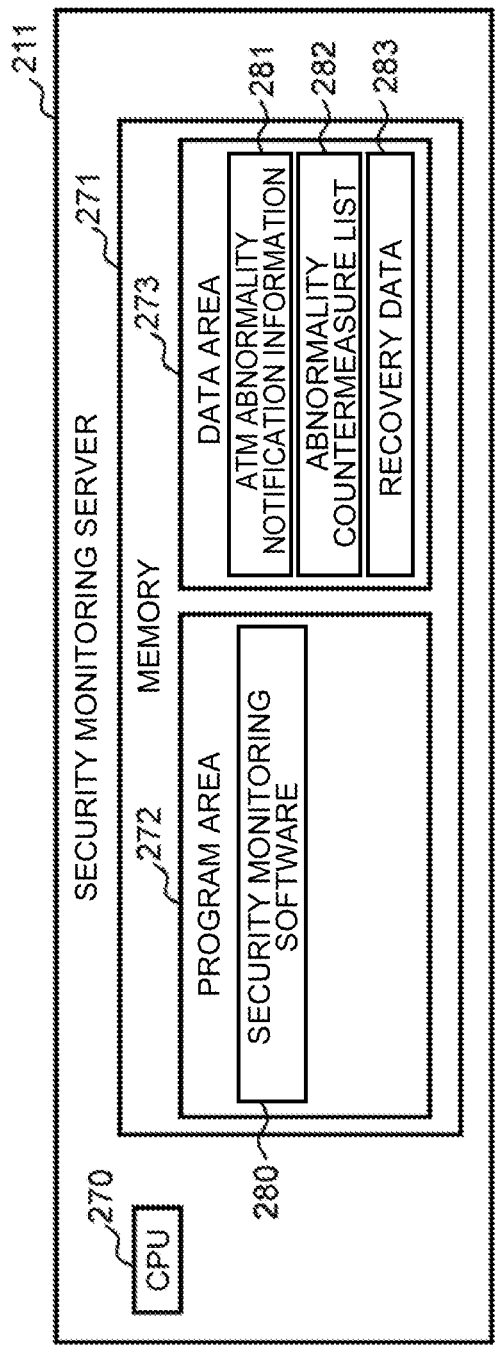
FIG. 17 is a diagram showing a schematic configuration of the security monitoring server according to the first embodiment.

FIG. 17 is a diagram showing a schematic configuration of the security monitoring server 211. The security monitoring server 211 is configured by comprising information processing resources such as a CPU 270 which governs the operational control of the overall security monitoring server 211, and a memory 271.

The storage area of the memory 271 is managed by being divided into a program area 272 and a data area 273. The program area 272 stores, for example, security monitoring software 280. The data area 273 stores ATM abnormality notification information 281, an abnormality countermeasure list 282, restoration data 283 and the like.

The security monitoring software 280 has a function of monitoring the security status of the ATM control unit 220, issuing a countermeasure order to the ATM 210 upon determining an abnormality, and enabling the transmission of data required for restoration from the time of abnormality. The ATM abnormality notification information 281 is notification data of the abnormal status sent from the ATM 210. The abnormality countermeasure list 282 is a list of countermeasure methods corresponding to the notified abnormal status. The restoration data 283 is data that is sent and received for causing the ATM 210 to enter a privileged mode when such privileged mode is required for the restoring the ATM 210 from an abnormal status to a normal status.

(Payout Transaction Processing in Automatic Transaction System 200)

Figure 18:
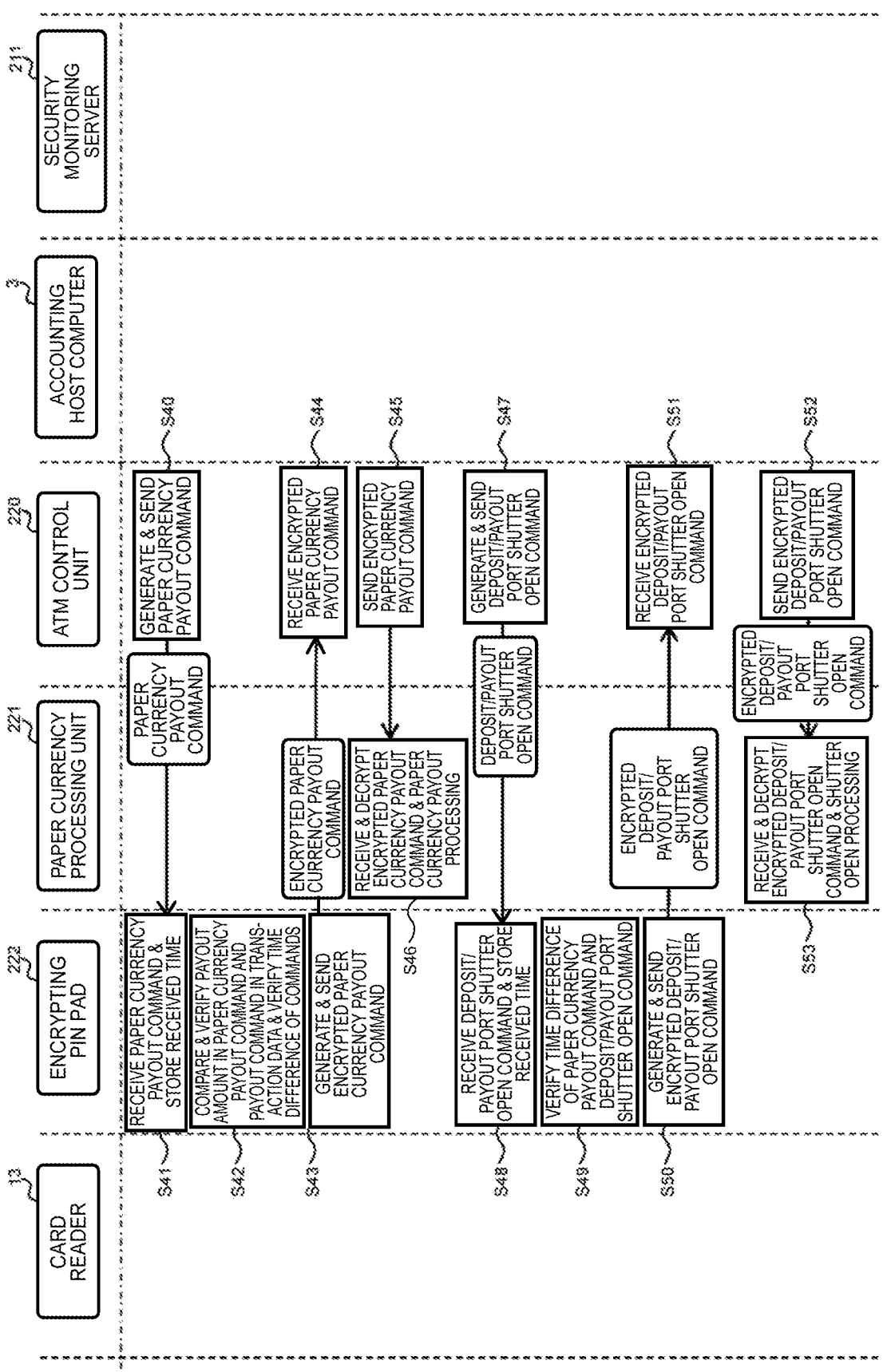
FIG. 18 is a diagram showing a flow of a payout transaction according to the first embodiment.

The flow of the payout transaction in the automatic transaction system 200 is now explained with reference to FIG. 18 to FIG. 20. Here, explained is a case where a magnetic stripe card is used as the card medium 21. Note that FIG. 18 is processing that follows the processing of step S1 to step S19 of FIG. 10, and, in order to clarify the differences in comparison to the conventional payout transaction, the processing of step S1 to step S19 of FIG. 10 is omitted, and the flow of the subsequent processing is shown. Here, let it be assumed that the sharing of an encryption key and the generation of a session required for the encrypted communication between the encrypting pin pad 222 and the paper currency processing unit 221 have been completed. Moreover, the exchange of known data required for the encrypted communication, such as challenge data and response data for preventing a replay attack in the encrypted communication, is also omitted.

Figure 10:
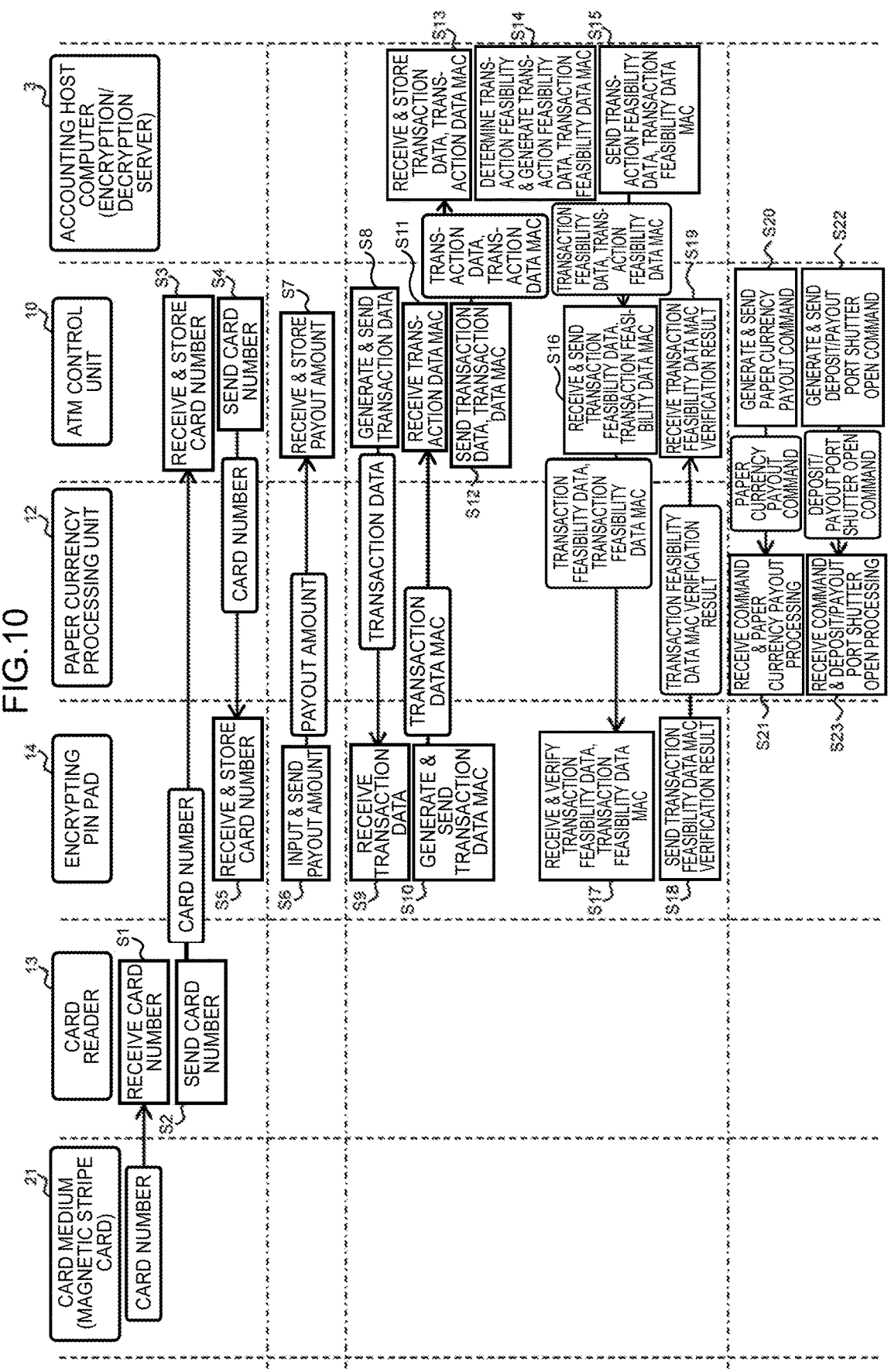
FIG. 10 is a diagram showing a flow of a conventional payout transaction processing.

Moreover, the transaction data and the transaction feasibility data required in step S42 are respectively acquired by the encrypting pin pad 222 in step S9 and step S17 of FIG. 10, and stored as the transaction-related data 135 and the transaction feasibility-related data 136 in the data area 123. Furthermore, in step S17, let it be assumed that the status table 262 stores status data regarding whether the transaction is in a concluded state or a non-concluded state according to the contents of the transaction feasibility data. Furthermore, in step S17, let it be assumed that the time data 261 stores the time that the transaction feasibility data MAC was received (this may also be the time that the transaction feasibility data MAC was verified).

As shown in FIG. 18, foremost, when the transaction feasibility data MAC verification result received in step S19 is correct and the transaction feasibility data indicates the conclusion of a transaction, the ATM control unit 220 determines that the transaction has been concluded and generates a paper currency payout command, and sends the generated paper currency payout command of a plain text to the encrypting pin pad 222 (step S40). When the encrypting pin pad 222 receives the plain text paper currency payout command, the encrypting pin pad 222 writes the received time as the time data 261 in the data area 123 (step S41).

Subsequently, the encrypting pin pad 222 compares the received time of the transaction feasibility data stored in step S17 and the time that the paper currency payout command was received in this step. When the time difference is within a certain threshold, the encrypting pin pad 222 determines that the sending of the paper currency payout command has not been obstructed by malware. Subsequently, the encrypting pin pad 222 refers to the status table 262 and confirms whether the payout transaction is in a concluded state. When the encrypting pin pad 222 determines that the payout transaction is in a concluded state, the encrypting pin pad 222 compares and verifies the payout amount of the transaction data acquired in step S9 and the payout amount included in the paper currency payout command (step S42).

Here, when the encrypting pin pad 222 determines that the two amounts are a match, the encrypting pin pad 222 determines that the sent paper currency payout command is the paper currency payout command of a substantiated transaction. Furthermore, the encrypting pin pad 222 compares the received time of the transaction feasibility data stored in step S17 and the time that the paper currency payout command was received in this step S42. When the time difference is within a certain threshold, the encrypting pin pad 222 determines that the sending of the paper currency payout command has not been obstructed by malware. When the encrypting pin pad 222 determines that the paper currency payout command is of a substantiated transaction and the sending of the payout command has not been obstructed by malware, the encrypting pin pad 222 encrypts a plain text paper currency payout command (generates an encrypted paper currency payout command), and sends the encrypted paper currency payout command to the ATM control unit 220 (step S43).

When the ATM control unit 220 receives the encrypted paper currency payout command (step S44), the ATM control unit 220 directly sends the received encrypted paper currency payout command to the paper currency processing unit 221 (step S45). When the paper currency processing unit 221 receives the encrypted paper currency payout command sent from the ATM control unit 220, the paper currency processing unit 221 decrypts the encrypted paper currency payout command, and performs paper currency payout processing (step S46).

The ATM control unit 220 additionally generates a deposit/payout port shutter open command, and sends a plain text deposit/payout port shutter open command to the encrypting pin pad 222 (step S47). When the encrypting pin pad 222 receives the plain text deposit/payout port shutter open command, the encrypting pin pad 222 writes the received time as the time data 261 in the data area 123 (step S48).

Subsequently, the encrypting pin pad 222 compares and verifies the received time stored in step S41 and the received time stored in step S48 (step S49). When the time difference is within a certain threshold, the encrypting pin pad 222 determines that the sending of the deposit/payout port shutter open command has not been obstructed by malware. When the encrypting pin pad 222 determines that the sending of the command has not been obstructed by malware, the encrypting pin pad 222 encrypts a plain text deposit/payout port shutter open command (generates an encrypted deposit/payout port shutter open command), and sends the generated deposit/payout port shutter open command to the ATM control unit 220 (step S50).

When the ATM control unit 220 receives the encrypted deposit/payout port shutter open command (step S51), the ATM control unit 220 directly sends the encrypted deposit/payout port shutter open command to the paper currency processing unit 221 (step S52). When the paper currency processing unit 221 receives the encrypted deposit/payout port shutter open command sent from the ATM control unit 220, the paper currency processing unit 221 decrypts the encrypted deposit/payout port shutter open command, and performs shutter open processing of opening the shutter of the deposit/payout port (step S53).

Note that, in order to detect that the communication to the paper currency processing unit 221 has been obstructed in the communication from step S43 to step S46 and in the communication from step S50 to step S53, the paper currency processing unit 221 may have a function of verifying the validity of the time that it received the command. Thus, the time data stored in step S17, step S42, and step S49 may be included in the command received by the paper currency processing unit 221.

Figure 19:
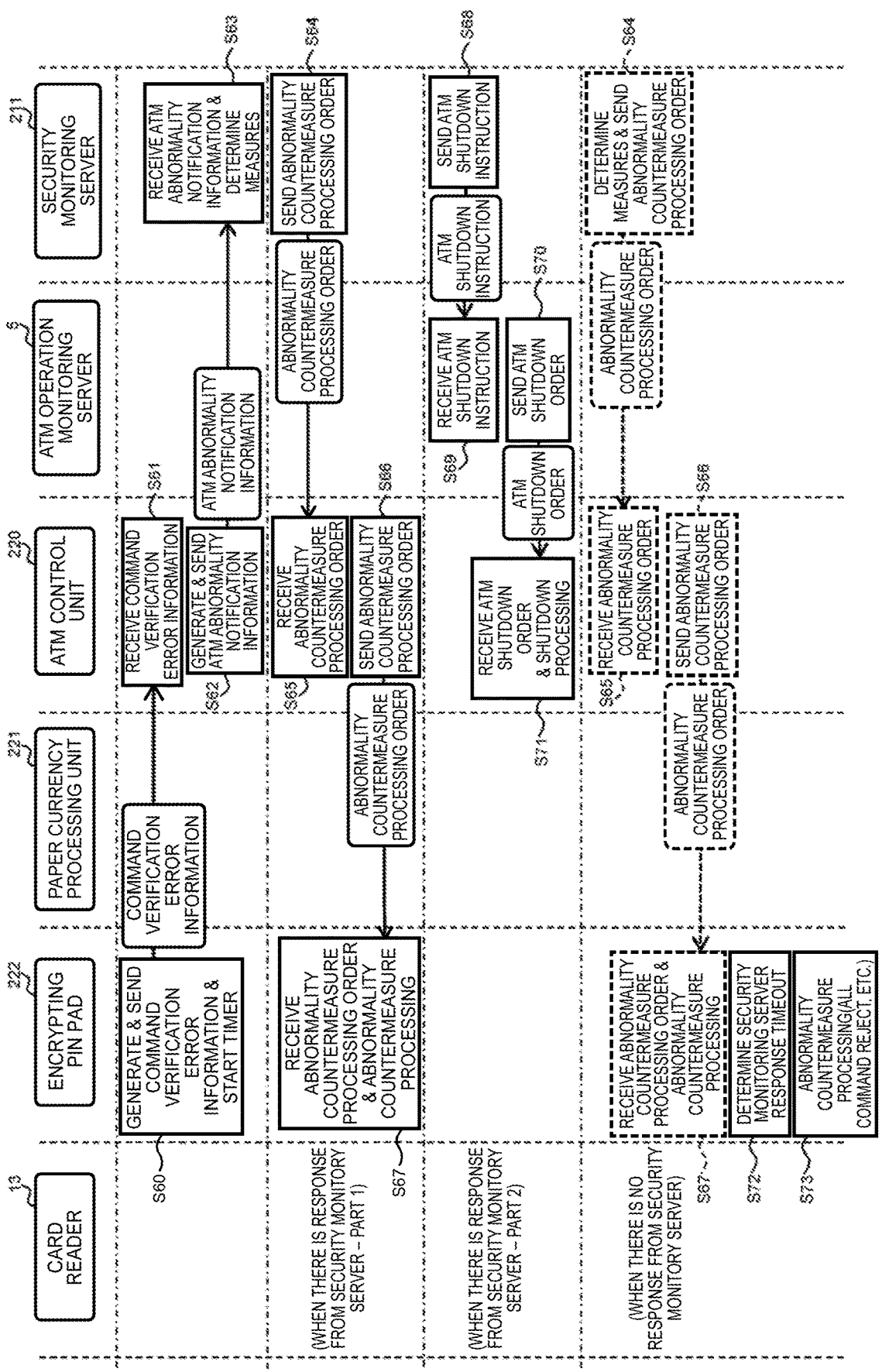
FIG. 19 is a diagram showing a flow upon abnormality in a payout transaction according to the first embodiment.

FIG. 19 shows the flow of processing when it is determined that the received command is a payout command of an unsubstantiated transaction in step S42 of FIG. 18, or when it is not determined that the sending of the command has not been obstructed by malware in step S49 (in the case of an abnormality). After the processing of either step S42 or step S49, the encrypting pin pad 222 generates command verification error information, and stores the generated command verification error information as the abnormality notification/abnormality processing data 263 in the data area 123. The command verification error information includes information for the security monitoring server 211 to determine the detailed status of the abnormality of the ATM 210, such as the transaction number included in the transaction data, and the time information at the time of the transaction for confirming the user's facial image captured by a monitoring camera 18. Subsequently, the encrypting pin pad 222 sends the command verification error information to the ATM control unit 220, and starts the timer for monitoring a time out; that is, whether a response from the security monitoring server 211 reaches the encrypting pin pad 222 within a prescribed time (step S60).

When the ATM control unit 220 receives the command verification error information (step S61), the ATM control unit 220 stores the received command verification error information in the security monitoring data 233, and additionally refers to the information included in the command verification error information, generates ATM abnormality notification information, and sends the generated ATM abnormality notification information to the security monitoring server 211 (step S62). Here, the ATM control unit 220 generates the ATM abnormality notification information, for instance, by referring to the time information included in the command verification error information, and acquiring the corresponding facial image data from the monitoring camera image data 55 or adding other supplementary information.

When the security monitoring server 211 receives the ATM abnormality notification information, the security monitoring server 211 refers to the abnormality countermeasure list 282 and extracts the countermeasure according to the abnormal status (step S63). Note that the processing of referring to the abnormality countermeasure list 282 and extracting the countermeasure according to the abnormal status may also be performed manually by operating the security monitoring server 211, and not by the security monitoring server 211. When the security monitoring server 211 determines that the abnormality countermeasure should be directly sent to the ATM 210, the security monitoring server 211 sends an abnormality countermeasure processing order to the ATM control unit 220 (step S64).

When the ATM control unit 220 receives the abnormality countermeasure processing order (step S65), the ATM control unit 220 forwards the abnormality countermeasure processing order to the encrypting pin pad 222 (step S66). When the encrypting pin pad 222 receives the abnormality countermeasure processing order, the encrypting pin pad 222 executes abnormality countermeasure processing such as operating in a degradation mode of refusing any and all subsequent commands based on the abnormality countermeasure processing order (step S67).

When the security monitoring server 211 determines in step S63 that an instruction for shutting down the ATM 210 (ATM shutdown instruction) should be issued to the ATM operation monitoring server 5, rather than directly sending the abnormality countermeasure processing order to the ATM 210, as a result of determining the measure to be taken, the security monitoring server 211 sends the ATM shutdown instruction to the ATM operation monitoring server 5 (step S68). Here, let it be assumed that the ATM operation monitoring server 5 has a function of shutting down the ATM 210. When the ATM operation monitoring server 5 receives the ATM shutdown instruction (step S69), the ATM operation monitoring server 5 sends the ATM shutdown order to the ATM control unit 220 (step S70). Subsequently, when the ATM control unit 220 receives the ATM shutdown order, the ATM control unit 220 executes shutdown processing (step S71). Note that the configuration may also be such that the security monitoring server 211 directly sends a shutdown order to the ATM 210.

Meanwhile, step S72 and step S73 are the processing in cases where the security monitoring server 211 is not functionally normally because the sending of the ATM abnormality notification information to the security monitoring server 211 was obstructed by malware existing in the ATM control unit 220, or due to other intrusions into the security monitoring server 211 from the outside. In the foregoing case, the processing of step S64 to step S67 will no longer exist, and the encrypting pin pad 222 determines that the timer started in step S60 will result in a time out exceeding the prescribed time (step S72). When the encrypting pin pad 222 determines that it is a time out, the encrypting pin pad 222 performs abnormality countermeasure processing of refusing all commands to the encrypting pin pad 222, for instance, according to the abnormality countermeasure list of the abnormality notification/abnormality processing data 263 (step S73).

Figure 20:
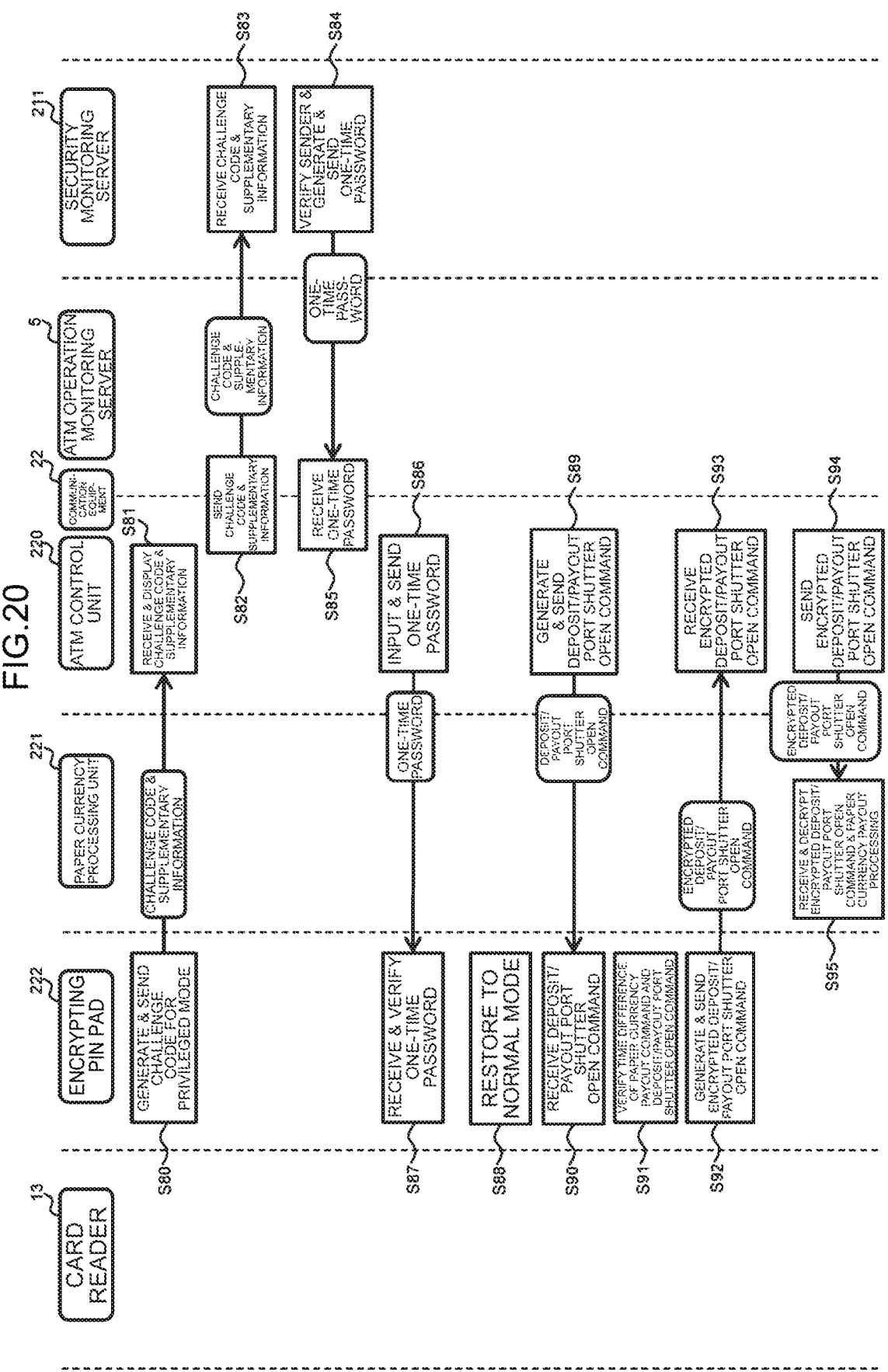
FIG. 20 is a diagram showing a flow of the restoration processing according to the first embodiment.

FIG. 20 shows the flow of the restoration processing for restoring the encrypting pin pad 222 to a normal status after the encrypting pin pad 222 performs the abnormality countermeasure processing of refusing all commands. For example, in cases where the ATM control unit 220 determines an abnormal status and is thereafter performing the abnormality countermeasure processing of refusing all commands when the encrypting pin pad 222 receives the deposit/payout port shutter open command, the paper currencies are still remaining in the deposit/payout port. In this state, if anyone is able to restore the status to a normal status, there is a risk that a malicious insider will steal the paper currencies remaining in the deposit/payout port by sending a deposit/payout port shutter open command to the encrypting pin pad 222. Thus, management using a privilege is required for restoring the encrypting pin pad 222 to a normal status, and FIG. 20 shows an example of the processing for entering a privileged mode by using a one-time password and restoring the encrypting pin pad 222.

Foremost, the encrypting pin pad 222 generates a challenge code for issuing a one-time password required in the privileged mode, and sends the generated challenge code, together with supplementary information such as the code indicating the abnormal status and the unique number of the encrypting pin pad 222, to the ATM control unit 220 (step S80). When the ATM control unit 220 receives the challenge code and the supplementary information, the ATM control unit 220 displays such information on the display unit 19 (step S81).

An operator who wishes to restore the encrypting pin pad 222 notifies the challenge code and the supplementary information displayed on the display unit 19 to the security monitoring server 211 (step S82). There is no limitation in the method of notifying the security monitoring server 211, and, for instance, the challenge code and the supplementary information may be input to the communication equipment 22 such as a mobile phone or a smartphone held by the operator and sent to the security monitoring server 211 via email, or the operator may call the administrator managing the security monitoring server 211 to notify the challenge code and the supplementary information, or other methods may be used to notify the challenge code and the supplementary information.

When the security monitoring server 211 or the administrator receives the challenge code and the supplementary information (step S83), the security monitoring server 211 or the administrator verifies the identity of the operator who sent the challenge code and the supplementary information, generates a one-time password for restoring the encrypting pin pad 222, and sends the generated one-time password to the communication equipment 22 such as a mobile phone or a smartphone via email or phone (step S84).

When the operator receives the sent one-time password (step S85), the operator inputs the one-time password using the display unit 19 or a dedicated keyboard (not shown) of the ATM 210 having an input function, and the ATM control unit 220 sends the one-time password to the encrypting pin pad 222 (step S86). Note that the configuration may also be such that the operator directly inputs the one-time password to the encrypting pin pad 222. When the encrypting pin pad 222 receives the one-time password, the encrypting pin pad 222 verifies the one-time password (step S87), and, upon determining that the one-time password is correct, restores the encrypting pin pad 222 to the normal mode (step S88).

Subsequently, the ATM control unit 220 generates a deposit/payout port shutter open command, and sends the generated deposit/payout port shutter open command to the encrypting pin pad 222 (step S89). Because the processing of subsequent step S90 to step S96 is basically the same as step S48 to step S53 of FIG. 18, the explanation thereof is omitted. Consequently, only the legitimate operator is able to remove the paper currencies remaining in the deposit/payout port.

(1-3) Effect of First Embodiment

As described above, with the automatic transaction system 200 of this embodiment, the encrypting pin pad 222 compares, based on the transaction data and the transaction feasibility data, the payout amount concluded in the transaction and the payout amount based on the denomination and number of paper currencies included in the paper currency payout command provided from the ATM control unit 220, and executes payout processing based on the paper currency payout command when there is no inconsistency.

Thus, according to the automatic transaction system 200, even if the ATM application 40 of the ATM control unit 220 is infected by malware and an unauthorized paper currency payout command of an unsubstantiated transaction is sent from the ATM control unit 220 to the encrypting pin pad 222, because the denomination and number of paper currencies included in the paper currency payout command will contradict the supporting data of the transaction (that is, because the total amount of denomination and number of paper currencies included in the paper currency payout command and the payout amount based on the supporting data will not be a match), the encrypting pin pad 222 will not send the encrypted paper currency payout command to the paper currency processing unit 221 and, therefore, payout processing based on the paper currency payout command will not be performed.

Thus, according to this embodiment, it is possible to realize a highly reliable automatic transaction apparatus in which unauthorized processing is not performed even when device control software such as the ATM application 40, the I/O control unit control software 41 or the paper currency processing unit control software 42 is fraudulently falsified by malware.

Furthermore, with the automatic transaction system 200, the encrypting pin pad 222 compares the difference between the received time of the paper currency payout command and the received time of the deposit/payout port shutter open command with the threshold, and, when the time difference exceeds the threshold, the encrypting pin pad 222 does not send the encrypted deposit/payout port shutter open command to the paper currency processing unit 221. Otherwise, the encrypting pin pad 222 compares the difference between the received time of the transaction feasibility data stored in step S17 and the received time of the deposit/payout port shutter open command and the threshold, and, when the time difference exceeds the threshold, the encrypting pin pad 222 does not send the encrypted deposit/payout port shutter open command to the ATM control unit 220 (paper currency processing unit 221). Consequently, it is possible to realize a highly reliable automatic transaction apparatus in which, even if malware temporarily stops the deposit/payout port shutter open command sent by the ATM application 40, and sends the deposit/payout port shutter open command to the encrypting pin pad 222 after the user of the ATM 210 walks away, the theft of paper currencies by opening the deposit/payout port shutter can be prevented.

Furthermore, according to this embodiment, the encrypting pin pad 222 that is independent from the ATM control unit 220 detects an abnormality of the ATM control unit 220, and notifies the abnormal status of the ATM control unit 220 to the security monitoring server 211. The security monitoring server 211 sends an abnormality countermeasure processing order to the ATM 210 in which an abnormality was notified, and the ATM 210 executes abnormality countermeasure processing based on the received abnormality countermeasure processing order. It is thereby possible to promptly detect an abnormality of the ATM control unit 220 and take measures, and prevent damages, such as an unauthorized payout, from spreading.

Furthermore, according to this embodiment, even in cases where the malware that entered the ATM control unit 220 obstructs the sending of the abnormal status of the ATM control unit 220 to the security monitoring server 211, or the security monitoring server 211 fails to function properly due to some reason, the encrypting pin pad 222 that is independent from the ATM control unit 220 is monitoring the time out of a response from the security monitoring server 211 in response to the abnormal status notice. Consequently, when a time out is detected, abnormality countermeasure processing of refusing all commands to the encrypting pin pad 222 is performed according to the internally retained abnormality countermeasure list. Consequently, it is possible to promptly detect an abnormality of the ATM control unit 220 and the security monitoring server 211 and take measures, and prevent damages, such as an unauthorized payout, from spreading.

Furthermore, according to this embodiment, for example, even if the encrypting pin pad 222 enters an abnormality countermeasure mode in a state where paper currencies are remaining in the deposit/payout port, and the abnormality countermeasure mode is cancelled to restore the encrypting pin pad 222, by setting a proper privileged mode, it is possible to prevent a malicious operator from stealing the paper currencies remaining in the deposit/payout port upon the restoration of the encrypting pin pad 222, and the restoration operation of a highly reliable automatic transaction apparatus can thereby be performed.

(2) Second Embodiment

The second embodiment is now explained mainly with reference to FIG. 10, FIG. 11, FIG. 19, and FIG. 21. Because the configuration of the second embodiment is basically the same as the configuration of the first embodiment, the different configuration (specifically, the deposit transaction) is mainly explained. The flow of the deposit transaction in the automatic transaction system 200 of this embodiment is now explained with reference to FIG. 21. Here, explained is a case of using a magnetic stripe card as the card medium 21.

Figure 21:
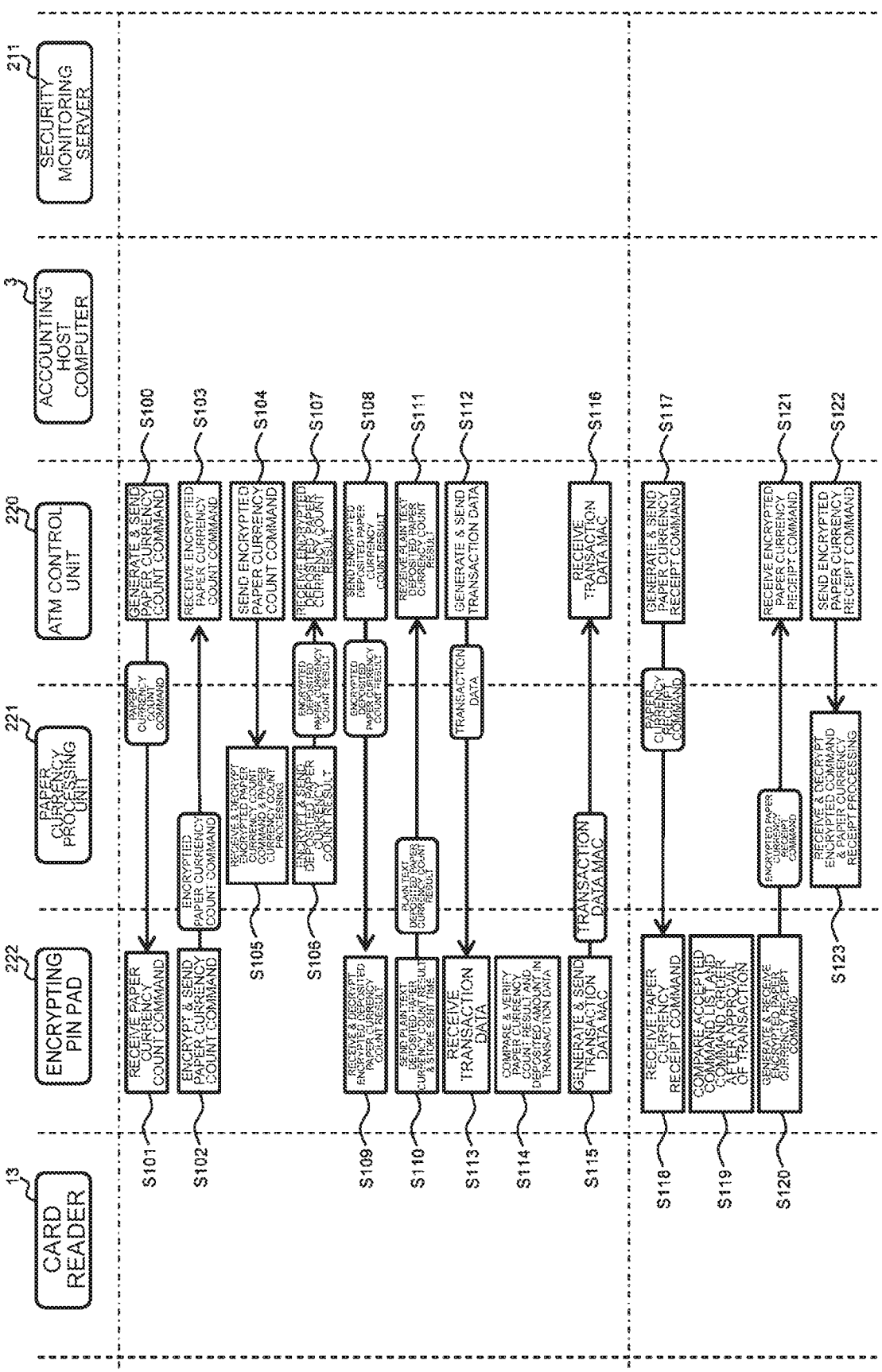
FIG. 21 is a diagram showing a flow of a deposit transaction according to the second embodiment.

Note that step S100 to step S116 of FIG. 21 are processing that follow step S1 to step S5 of FIG. 10, and step S6 to step S11 of FIG. 10 have been replaced by step S100 to step S116. Note that, as previously explained in the conventional deposit transaction processing of FIG. 11, it can also be said that step S30 to step S33 have been replaced by step S100 to step S111 of FIG. 21.

Furthermore, step S117 to step S123 of FIG. 21 are processing that follow step S12 to step S19 of FIG. 10, and step S20 to step S23 have been replaced by step S117 to step S123. Note that, as previously explained in the conventional deposit transaction processing of FIG. 11, it can also be said that step S34 and step S35 have been replaced by step S117 to step S123. As described above, the explanation of processing that overlaps with FIG. 10 is omitted to clarify the differences in comparison to the conventional deposit transaction processing.

In this embodiment, similar to the first embodiment, let it be assumed that the sharing of an encryption key and the generation of a session required for the encrypted communication between the encrypting pin pad 222 and the paper currency processing unit 221 have been completed. Moreover, the exchange of known data required for the encrypted communication, such as challenge data and response data for preventing a replay attack in the encrypted communication, is also omitted. Let it also be assumed that the card number required in step S114 is acquired by the encrypting pin pad 222 in step S5 of FIG. 10, and stored as the plain text data 133 in the data area 123. Note that, when the card number is acquired in encrypted form, let it be assumed that the card number is stored as the encrypted data 134 in the data area 123.

Let it be assumed that the transaction data and the transaction feasibility data required in step S119 are respectively acquired by the encrypting pin pad 222 in step S9 and step S17 of FIG. 10, and stored in the transaction-related data 135, and the transaction feasibility-related data 136. Furthermore, in step S17, let it be assumed that the status table 262 stores status data regarding whether the transaction is in a concluded state or a non-concluded state according to the contents of the transaction feasibility data. Furthermore, in step S17, let it be assumed that the time data 261 stores the time that the transaction feasibility data MAC was received (this may also be the time that the transaction feasibility data MAC was verified).

(Deposit Transaction Processing in Automatic Transaction System 200)

Foremost, the ATM control unit 220 generates (the ATM application 40 generates via the paper currency processing unit control software 42) a paper currency count command for counting the total amount of paper currencies placed in the ATM 210, and stores the generated paper currency count command as the command/response data 54 in the data area 33. The ATM control unit 220 sends the stored paper currency count command to the encrypting pin pad 222 (step S100). When the encrypting pin pad 222 receives the paper currency count command (step S101), the encrypting pin pad 222 stores the received paper currency count command in the plain text data 133, encrypts the paper currency count command (generates an encrypted paper currency count command), and stores the encrypted paper currency count command as the encrypted data 134 in the data area 123. Subsequently, the encrypting pin pad 222 sends the encrypted paper currency count command to the ATM control unit 220 (step S102).

When the ATM control unit 220 receives the encrypted paper currency count command (step S103), the ATM control unit 220 sends the encrypted paper currency count command directly to the paper currency processing unit 221 (step S104). When the paper currency processing unit 221 receives the encrypted paper currency count command sent from the ATM control unit 220, the paper currency processing unit 221 decrypts the encrypted paper currency count command, and performs paper currency count processing (step S105). Note that the counted paper currencies are stored in the temporary cashbox. The paper currency processing unit 221 encrypts the deposited paper currency count result (generates an encrypted deposited paper currency count result), and sends the encrypted deposited paper currency count result to the ATM control unit 220 (step S106). When the ATM control unit 220 receives the encrypted deposited paper currency count result (step S107), the ATM control unit 220 sends the encrypted deposited paper currency count result directly to the encrypting pin pad 222 (step S108).

When the encrypting pin pad 222 receives the encrypted deposited paper currency count result, the encrypting pin pad 222 decrypts the encrypted deposited paper currency count result, and stores the decrypted encrypted deposited paper currency count result as the plain text data 133 in the data area 123 (step S109). The stored deposited paper currency count result is used in step S114. Subsequently, the encrypting pin pad 222 sends the plain text deposited paper currency count result to the ATM control unit 220, and stores the transmission time as the time data 261 in the data area 123 (step S110).

Subsequently, the ATM control unit 220 receives the plain text deposited paper currency count result (step S111), generates transaction data by using the card number obtained in step S3 of FIG. 10 and the received deposited paper currency count result, and stores the generated transaction data as the transaction-related data 51 in the data area 33. Subsequently, the ATM control unit 220 sends the transaction data to the encrypting pin pad 222 for assigning a transaction data MAC to the transaction data (step S112).

When the encrypting pin pad 222 receives the transaction data (step S113), the encrypting pin pad 222 compares and verifies whether the card number stored in step S5 of FIG. 10 and the deposited paper currency count result stored in step S109 and the corresponding sections of the transaction data respectively match (step S114). When the encrypting pin pad 222 determines that they are a match, the encrypting pin pad 222 generates a transaction data MAC corresponding to the transaction data, and sends the generated transaction data MAC to the ATM control unit 220 (step S115). The ATM control unit 220 receives the sent transaction data MAC (step S116).

Subsequently, processing of step S12 to step S19 of FIG. 10 is executed. However, as described above, in step S17, let it be assumed that the status table 262 stores status data regarding whether the transaction is in a concluded state or a non-concluded state according to the contents of the transaction feasibility data. Furthermore, in step S17, let it be assumed that the time data 261 stores the time that the transaction feasibility data MAC was received (this may also be the time that the transaction feasibility data MAC was verified).

When the transaction feasibility data MAC verification result received in step S19 is correct and the transaction feasibility data indicates the conclusion of a transaction, the ATM control unit 220 determines that the transaction has been concluded and generates a paper currency payout command, and sends the generated paper currency payout command to the encrypting pin pad 222 (step S117). When the encrypting pin pad 222 receives the paper currency payout command (step S118), the encrypting pin pad 222 refers to the status table 262, confirms that the deposit transaction has been concluded, compares the command list and the command order that are permitted after the conclusion of the deposit transaction with the time data 261 stored in step S110, and confirms that there is no inconsistency (step S119).

Specifically, when a deposit transaction has been concluded with the accounting host computer 3, the encrypting pin pad 222 must execute a paper currency receipt command for moving the paper currencies stored in the temporary cashbox to the cashbox. Meanwhile, when a deposit transaction cannot be concluded with the accounting host computer 3 for one reason or another or the user of the ATM 210 cancels the deposit transaction, the paper currency return command for returning the paper currencies stored in the temporary cashbox to the deposit/payout port and the deposit/payout port shutter open command for opening the shutter of the deposit/payout port will be sent to the encrypting pin pad 222.

Nevertheless, if malware enters the ATM control unit 220, there is a possibility that the paper currency return command and the deposit/payout port shutter open command are sent to the encrypting pin pad 222 despite the deposit transaction being concluded. In the foregoing case, this will result in an inconsistency with the command list and the command order that are permitted after the conclusion of the deposit transaction. When the encrypting pin pad 222 determines that there is no inconsistency, the encrypting pin pad 222 encrypts the received paper currency receipt command (generates an encrypted paper currency receipt command), and sends the encrypted paper currency receipt command to the ATM control unit 220 (step S120).

When the ATM control unit 220 receives the encrypted paper currency receipt command (step S121), the ATM control unit 220 sends the encrypted paper currency receipt command directly to the paper currency processing unit 221 (step S122). When the paper currency processing unit 221 receives the encrypted paper currency receipt command sent from the ATM control unit 220, the paper currency processing unit 221 decrypts the encrypted paper currency receipt command, and performs paper currency receipt processing of transferring the paper currencies housed in the temporary cashbox to the cashbox (step S123). Note that, when the ATM 210 is not equipped with a temporary cashbox and the paper currencies are already in the cashbox, the processing of step S117 to step S122 is omitted.

Figure 11:
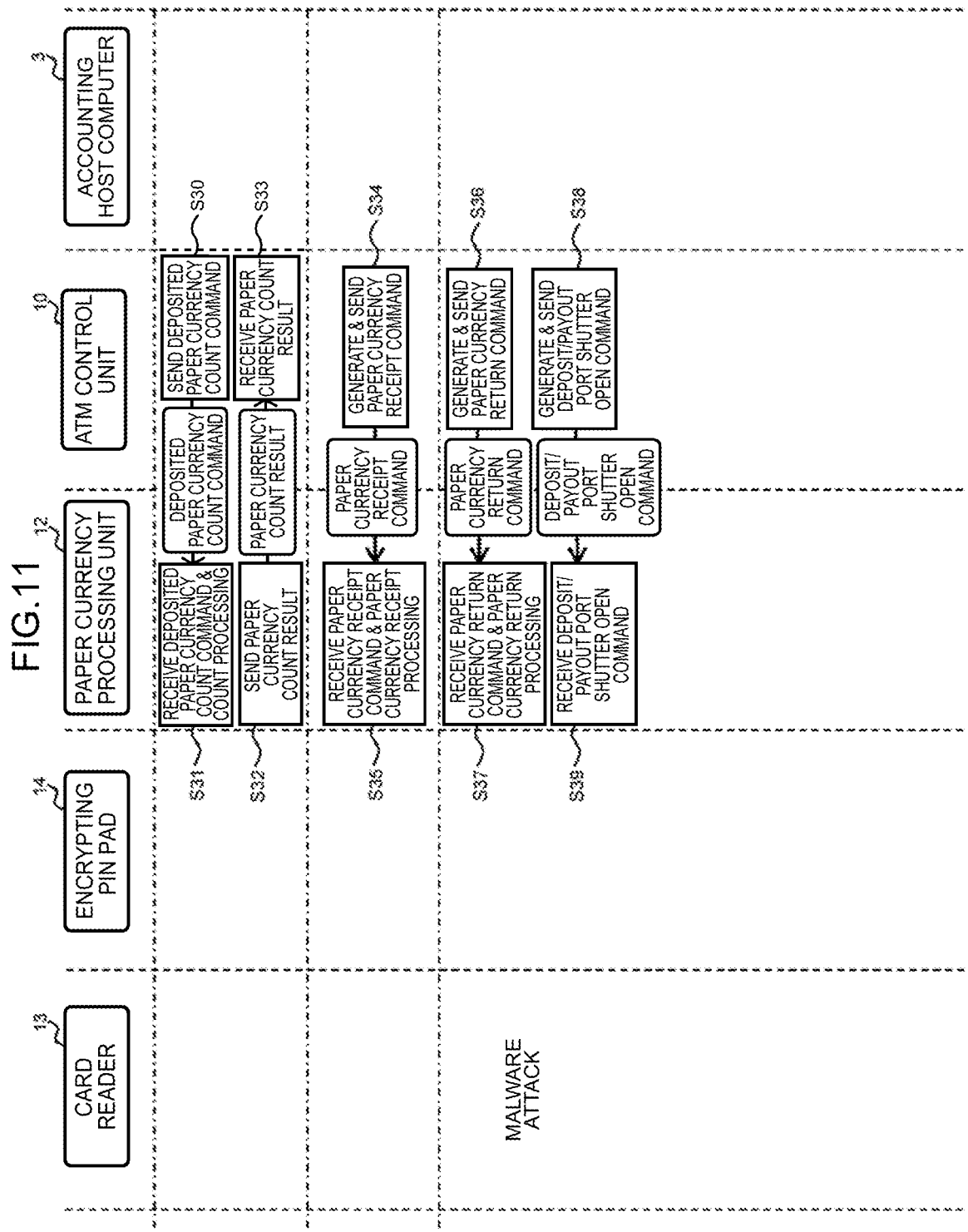
FIG. 11 is a diagram showing a flow of a conventional deposit transaction processing.

In step S119, if malware exists in the ATM control unit 220, let it be assumed that the paper currency return command and the deposit/payout port shutter open command are sent to the encrypting pin pad 222 as shown in step S36 to step S39 of FIG. 11 in substitute for the paper currency receipt command. In the foregoing case, the encrypting pin pad 222 refers to the status table 262, determines that there will be an inconsistency when compared with the command list and the command order that are permitted after the conclusion of the deposit transaction, and it is possible to know that an unauthorized command was sent from the malware.

Consequently, in substitute for the encrypting pin pad 222 executing step S120, step S60 to step S73 of FIG. 18 will be executed as with the first embodiment. Subsequently, step S80 to step S96 of FIG. 20 are executed so that the operator will not fraudulently acquire the paper currencies remaining the temporary cashbox upon restoring the encrypting pin pad 222 from an abnormal mode to a normal mode.

In another example, let it be assumed that the malware in the ATM control unit 220 obstructs the reception of the plain text deposited paper currency count result in step S111, blocks subsequent transaction processing, and, after the user of the ATM 210 walks away from the ATM 210, a malicious third party operates the malware and sends the paper currency return command and the deposit/payout port shutter open command to the encrypting pin pad 222. In the foregoing case, because the deposit transaction has not been concluded, the paper currency return command and the deposit/payout port shutter open command are sent to the encrypting pin pad 22 with the appearance of a normal transaction because the user of the ATM 210 has cancelled the transaction after the deposited paper currencies have been counted. Nevertheless, because the time that the plain text deposited paper currency count result was sent in step S110 and the time that the paper currency return command was received are compared and the time difference exceeds the threshold, it is possible to determine that it is a fraudulent command based on malware. Here, in addition to the foregoing time difference, a facial recognition result of the user for confirming whether the user of the ATM 210 has been replaced may be concurrently used.

As described above, with the automatic transaction system 200 of this embodiment, the encrypting pin pad 222 compares the paper currency deposited amount counted by the paper currency processing unit 221 and the deposited amount included in the transaction data, and, upon determining that they are a match, calculates a transaction data MAC corresponding to the transaction data, and sends the calculated transaction data MAC to the ATM control unit 220.

Thus, according to the automatic transaction system 200, even if the ATM application 40 of the ATM control unit 220 is infected by malware and unauthorized transaction data of an unsubstantiated transaction of the paper currency deposited amount counted by the paper currency processing unit 221 is sent from the ATM control unit 220 to the encrypting pin pad 222, because this will be inconsistent with the deposited amount included in the transaction data (that is, because the total amount of denomination and number of paper currencies included in the paper currency deposited paper currency count result and the deposited amount included in the transaction data will not be a match), the encrypting pin pad 222 will not send the transaction data MAC corresponding to the transaction data to the ATM control unit 220. Consequently, the transaction data cannot be sent to the accounting host computer 3 and, therefore, deposit transaction processing based on an unauthorized command will not be performed.

Thus, according to this embodiment, it is possible to realize a highly reliable automatic transaction apparatus in which unauthorized deposit transaction processing is not performed even when device control software such as the ATM application 40, the I/O control unit control software 41 or the paper currency processing unit control software 42 is fraudulently falsified by malware.

Furthermore, with the automatic transaction system 200 of this embodiment, the encrypting pin pad 222 confirms whether a deposit transaction with the accounting host computer 3 has been concluded, compares it with the command list and the command order that are permitted after the conclusion of the deposit transaction, confirms that there is no inconsistency, and sends the encrypted paper currency receipt command, or sends the paper currency return command and the deposit/payout port shutter open command. It is thereby possible to realize a highly reliable automatic transaction apparatus in which, even if the paper currency return command and the deposit/payout port shutter open command are sent to the encrypting pin pad 222 after the deposit transaction is concluded and the user of the ATM 210 walks away, and attempts to open the deposit/payout port shutter and attempts to steal the paper currency, such theft can be prevented.

Furthermore, according to this embodiment, the encrypting pin pad 222 that is independent from the ATM control unit 220 detects an abnormality of the ATM control unit 220, and notifies the abnormal status of the ATM control unit 220 to the security monitoring server 211. The security monitoring server 211 sends an abnormality countermeasure processing order to the ATM 210 in which an abnormality was notified, and the ATM 210 executes abnormality countermeasure processing based on the received abnormality countermeasure processing order. It is thereby possible to promptly detect an abnormality of the ATM control unit 220 and take measures, and prevent damages caused by fraudulence during a deposit from spreading.

Furthermore, according to this embodiment, even in cases where the malware that entered the ATM control unit 220 obstructs the sending of the abnormal status of the ATM control unit 220 to the security monitoring server 211, or the security monitoring server 211 fails to function properly due to some reason, the encrypting pin pad 222 that is independent from the ATM control unit 220 is monitoring the time out of a response from the security monitoring server 211 in response to the abnormal status notice. Consequently, when a time out is detected, the encrypting pin pad 222 performs abnormality countermeasure processing of refusing all commands to the encrypting pin pad 222 according to the internally retained abnormality countermeasure list. Consequently, it is possible to promptly detect an abnormality of the ATM control unit 220 and the security monitoring server 211 and take measures, and prevent damages caused by fraudulence during a deposit from spreading.

Furthermore, according to this embodiment, even if the encrypting pin pad 222 enters an abnormality countermeasure mode in a state where paper currencies are remaining in the deposit/payout port, and the abnormality countermeasure mode is cancelled to restore the encrypting pin pad 222, by setting a proper privileged mode, it is possible to prevent a malicious operator from stealing the paper currencies remaining in the deposit/payout port upon the restoration of the encrypting pin pad 222, and the restoration operation of a highly reliable automatic transaction apparatus can thereby be performed.

(3) Third Embodiment

The third embodiment is now explained mainly with reference to FIG. 10, FIG. 16, and FIG. 22 to FIG. 24. Because the configuration of the third embodiment is basically the same as the configuration of the first embodiment, the different configuration (specifically, configuration in which the card reader 290 performs the predetermined processing performed by the encrypting pin pad 222) is mainly explained.

Figure 22:
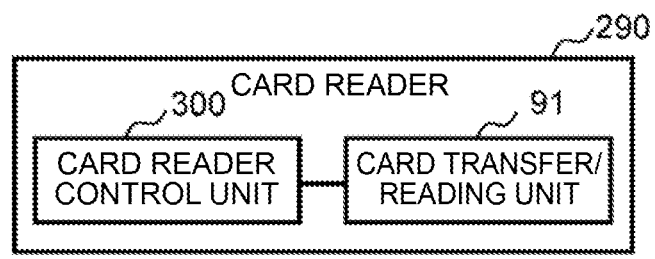
FIG. 22 is a diagram showing a functional configuration of a card reader according to the third embodiment.

FIG. 22 is a diagram showing a functional configuration of the card reader 290. The card reader 290 is configured by comprising a card reader control unit 300, and a card transfer/reading unit 91. Note that the explanation of the same functions as the card reader 13 equipped in the card reader 290 is omitted.

The card reader control unit 300 is hardware with a function of controlling the card transfer/reading unit 91, and sending and receiving commands and responses to and from the ATM control unit 220.

Figure 23:
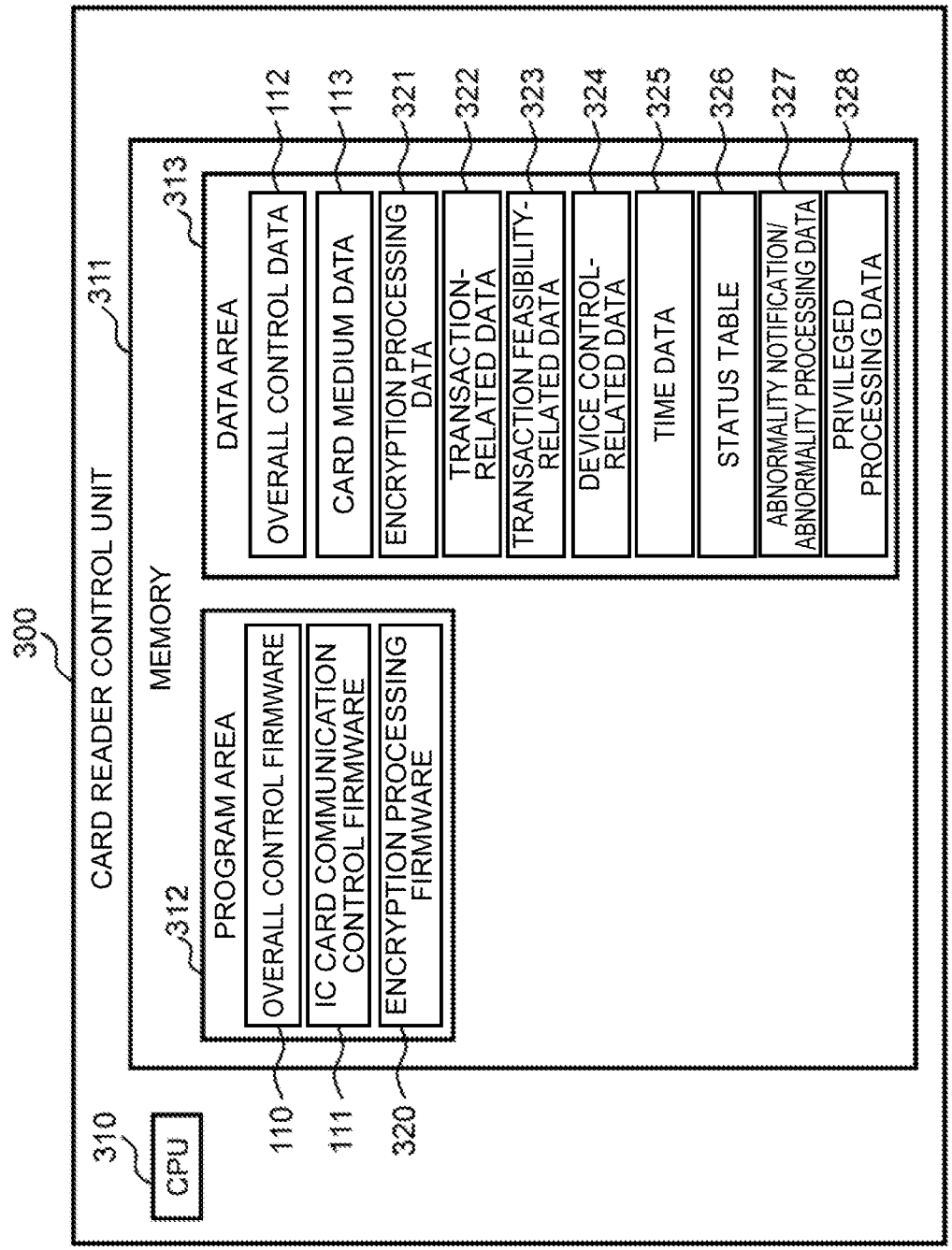
FIG. 23 is a diagram showing a schematic configuration of a card reader control unit according to the third embodiment.

FIG. 23 is a diagram showing a schematic configuration of the card reader control unit 300. Here, the main configuration that differs from the card reader control unit 90 is explained. The encryption processing firmware 320 has the function of calculating the transaction data MAC corresponding to the transaction data, and verifying the electronic signature or the message authentication code corresponding to the transaction feasibility data sent from the accounting host computer 3. Furthermore, the encryption processing firmware 320 performs processing of encryption/decryption required for the encrypted communication with other devices such as the paper currency processing unit 221. The encryption processing data 321 is data that is used by the encryption processing firmware 320 for performing encryption processing. Because the transaction-related data 322 to the privileged processing data 328 are the same as the transaction-related data 135 to the privileged processing data 264 shown in FIG. 16, the explanation thereof is omitted.

(Payout Transaction Processing in Automatic Transaction System 200)

Figure 24:
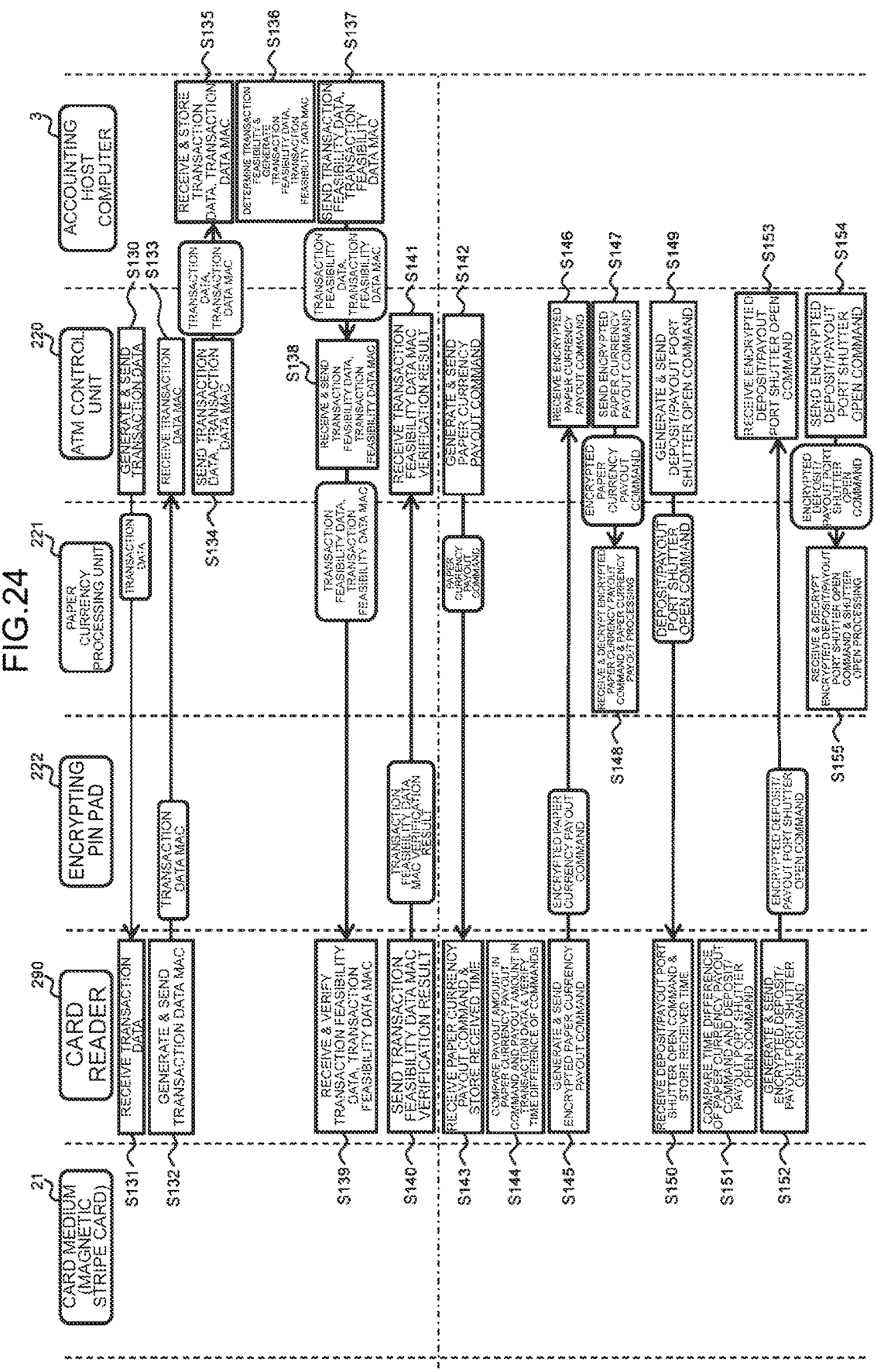
FIG. 24 is a diagram showing a flow of a payout transaction according to the third embodiment.

The flow of the payout transaction in the automatic transaction system 200 of this embodiment is now explained with reference to FIG. 24. Here, explained is a case where a magnetic stripe card is used as the card medium 21. Note that step S130 to step S155 of FIG. 24 are processing that follows step S1 to step S7 of FIG. 10. Here, let it be assumed that the sharing of an encryption key and the generation of a session required for the encrypted communication between the card reader 290 and the paper currency processing unit 221, and between the card reader 290 and the accounting host computer 3, have been completed. Moreover, the exchange of known data required for the encrypted communication, such as challenge data and response data for preventing a replay attack in the encrypted communication, is also omitted.

Foremost, the ATM control unit 220 generates transaction data by using the card number received in step S3 and the payout amount received in step S7, and sends the transaction data to the card reader 290 for assigning a transaction data MAC corresponding to the transaction data (step S130).

When the card reader 290 receives the sent transaction data (step S131), the card reader 290 stores the received transaction data as the transaction-related data 322 in the data area 313. Subsequently, the card reader 290 calculates (generates) a transaction data MAC corresponding to the transaction data, stores the result as the transaction-related data 322 in the data area 313, and sends the transaction data MAC to the ATM control unit 220 (step S132).

When the ATM control unit 220 receives the transaction data MAC, the ATM control unit 220 stores the received transaction data MAC as the transaction-related data 51 in the data area 33 (step S133), and sends the transaction data MAC, together with the previously stored transaction data, to the accounting host computer 3 (step S134). The accounting host computer 3 performs the same processing as step S13 and step S14 (step S135 and step S136), and returns the transaction feasibility data, and the transaction feasibility data MAC corresponding to the transaction feasibility data, to the ATM control unit 220 (step S137).

When the ATM control unit 220 receives the transaction feasibility data sent from the host computer 3 and the corresponding transaction feasibility data MAC, the ATM control unit 220 stores the transaction feasibility data and the corresponding transaction feasibility data MAC as the transaction feasibility-related data 52 in the data area 33, and sends such data to the card reader 290 (step S138).

When the card reader 290 receives the transaction feasibility data sent from the ATM control unit 220 and the corresponding transaction feasibility data MAC, the card reader 290 stores the transaction feasibility data and the corresponding transaction feasibility data MAC as the transaction feasibility-related data 323 in the data area 313. Subsequently, the card reader 290 calculates the transaction feasibility data MAC corresponding to the transaction feasibility data, verifies the legitimacy of the transaction feasibility data, and stores the verification result as the transaction feasibility-related data 323 (transaction feasibility data MAC verification result) in the data area 313. Furthermore, the card reader 290 writes into the status table 326 the status data regarding whether the transaction is in a concluded state or a non-concluded state according to the contents of the transaction feasibility data, and additionally writes the time that the transaction feasibility data was received in the time data 325 (step S139). The card reader 290 reads the transaction feasibility data MAC verification result from the transaction feasibility-related data 323, and sends the read transaction feasibility data MAC verification result to the ATM control unit 220 (step S140).

When the ATM control unit 220 receives the transaction feasibility data MAC verification result sent from the card reader 290 (step S141), the ATM control unit 220 stores the received transaction feasibility data MAC verification result as the transaction verification result data 53 in the data area 33, and, when the verification result is correct and the transaction feasibility data indicates the conclusion of a transaction, determines that the transaction has been concluded and generates a plain text paper currency payout command, and sends the generated paper currency payout command to the card reader 290 (step S142). When the ATM control unit 220 determines that the transaction has not been concluded, the ATM control unit 220 displays a message on the display unit 19 to notify the user of the ATM 210 that the transaction could not be concluded.

When the card reader 290 receives a plain text paper currency payout command, the card reader 290 writes the received time in the time data 325 (step S143). Subsequently, the card reader 290 refers to the status table 326 and confirms whether the payout transaction is in a concluded state. When the card reader 290 determines that the transaction has been concluded, the card reader 290 compares the payment amount of the transaction data acquired in step S131 and the payout amount included in the paper currency payout command (step S144). When the card reader 290 determines that the two amounts are a match, the card reader 290 determines that the paper currency payout command sent to the card reader 290 is a paper currency payout command of a substantiated transaction. Furthermore, in step S144, the card reader 290 compares the received time of the transaction feasibility data stored in step S139 and the time that the paper currency payout command was received in this step S143. When the time difference is within a certain threshold, the card reader 290 determines that the sending of the paper currency payout command has not been obstructed by malware. When the card reader 290 determines that the paper currency payout command is of a substantiated transaction and the sending of the payout command has not been obstructed by malware, the card reader 290 encrypts a plain text paper currency payout command (generates an encrypted paper currency payout command), and sends the encrypted paper currency payout command to the ATM control unit 220 (step S145).

When the ATM control unit 220 receives the encrypted paper currency payout command (step S146), the ATM control unit 220 sends the encrypted paper currency payout command directly to the paper currency processing unit 221 (step S147). When the paper currency processing unit 221 receives the encrypted paper currency payout command sent from the ATM control unit 220, the paper currency processing unit 221 decrypts the encrypted paper currency payout command, and performs paper currency payout processing (step S148).

The ATM control unit 220 additionally generates a deposit/payout port shutter open command, and sends a plain text deposit/payout port shutter open command to the card reader 290 (step S149). When the card reader 290 receives the plain text deposit/payout port shutter open command, the card reader 290 writes the received time as the time data 261 in the data area 123 (step S150). Subsequently, the card reader 290 compares and verifies the received time stored in step S143 and the received time stored in step S150 (step S151). When the time difference is within a certain threshold, the card reader 290 determines that the sending of the deposit/payout port shutter open command has not been obstructed by malware. When the card reader 290 determines that the sending of the command has not been obstructed by malware, the card reader 290 encrypts a plain text deposit/payout port shutter open command (generates an encrypted deposit/payout port shutter open command), and sends the generated deposit/payout port shutter open command to the ATM control unit 220 (step S152).

When the ATM control unit 220 receives the encrypted deposit/payout port shutter open command (step S153), the ATM control unit 220 directly sends the encrypted deposit/payout port shutter open command to the paper currency processing unit 221 (step S154). When the paper currency processing unit 221 receives the encrypted deposit/payout port shutter open command sent from the ATM control unit 220, the paper currency processing unit 221 decrypts the encrypted deposit/payout port shutter open command, and opens the shutter of the deposit/payout port (step S155).

Because a case where it is determined in step S144 that it is a paper currency payout command of a substantiated transaction, or a case where it is determined that the sending of the command was not obstructed by malware in step S151, is the same as the first embodiment, the explanation thereof is omitted.

As described above, with the automatic transaction system 200 of this embodiment, the card reader 290 compares, based on the transaction data and the transaction feasibility data, the payout amount concluded in the transaction and the payout amount based on the denomination and number of paper currencies included in the paper currency payout command provided from the ATM control unit 220, and executes payout processing based on the paper currency payout command when there is no inconsistency.

Thus, according to the automatic transaction system 200, even if the ATM application 40 of the ATM control unit 220 is infected by malware and an unauthorized paper currency payout command of an unsubstantiated transaction is sent from the ATM control unit 220 to the card reader 290, because the denomination and number of paper currencies included in the paper currency payout command will contradict the supporting data of the transaction (that is, because the total amount of denomination and number of paper currencies included in the paper currency payout command and the payout amount based on the supporting data will not be a match), the card reader 290 will not send the encrypted paper currency payout command to the ATM control unit 220 (paper currency processing unit 221) and, therefore, payout processing based on the paper currency payout command will not be performed.

Thus, according to this embodiment, it is possible to realize a highly reliable automatic transaction apparatus in which unauthorized processing is not performed even when device control software such as the ATM application 40, the I/O control unit control software 41 or the paper currency processing unit control software 42 is fraudulently falsified by malware.

Furthermore, with the automatic transaction system 200, the card reader 290 compares the difference between the received time of the paper currency payout command and the received time of the deposit/payout port shutter open command with the threshold, and, when the time difference exceeds the threshold, the card reader 290 does not send the encrypted deposit/payout port shutter open command to the ATM control unit 220 (paper currency processing unit 221). Otherwise, the card reader 290 compares the difference between the received time of the transaction feasibility data stored in step S139 and the received time of the deposit/payout port shutter open command and the threshold, and, when the time difference exceeds the threshold, the card reader 290 does not send the encrypted deposit/payout port shutter open command to the ATM control unit 220 (paper currency processing unit 221). Consequently, it is possible to realize a highly reliable automatic transaction apparatus in which, even if malware temporarily stops the deposit/payout port shutter open command sent by the ATM application 40, and sends the deposit/payout port shutter open command to the card reader 290 after the user of the ATM 210 walks away, the theft of paper currencies by opening the deposit/payout port shutter can be prevented.

Furthermore, according to this embodiment, the card reader 290 that is independent from the ATM control unit 220 detects an abnormality of the ATM control unit 220, and notifies the abnormal status of the ATM control unit 220 to the security monitoring server 211. The security monitoring server 211 sends an abnormality countermeasure processing order to the ATM 210 in which an abnormality was notified, and the ATM 210 executes abnormality countermeasure processing based on the received abnormality countermeasure processing order. It is thereby possible to promptly detect an abnormality of the ATM control unit 220 and take measures, and prevent damages, such as an unauthorized payout, from spreading.

Furthermore, according to this embodiment, even in cases where the malware that entered the ATM control unit 220 obstructs the sending of the abnormal status of the ATM control unit 220 to the security monitoring server 211, or the security monitoring server 211 fails to function properly due to some reason, the card reader 290 that is independent from the ATM control unit 220 is monitoring the time out of a response from the security monitoring server 211 in response to the abnormal status notice. Consequently, when a time out is detected, abnormality countermeasure processing of refusing all commands to the card reader 290 is performed according to the internally retained abnormality countermeasure list. Consequently, it is possible to promptly detect an abnormality of the ATM control unit 220 and the security monitoring server 211 and take measures, and prevent damages, such as an unauthorized payout, from spreading.

Furthermore, according to this embodiment, even if the card reader 290 enters an abnormality countermeasure mode in a state where paper currencies are remaining in the deposit/payout port, and the abnormality countermeasure mode is cancelled to restore the card reader 290, by setting a proper privileged mode, it is possible to prevent a malicious operator from stealing the paper currencies remaining in the deposit/payout port upon the restoration of the card reader 290, and the restoration operation of a highly reliable automatic transaction apparatus can thereby be performed.

(4) Fourth Embodiment

The fourth embodiment is now explained mainly with reference to FIG. 10, FIG. 11, and FIG. 19 to FIG. 25. Because the configuration of the fourth embodiment is basically the same as the configuration of the third embodiment, the different configuration (specifically, configuration in which the card reader 290 performs the predetermined processing performed by the encrypting pin pad 222 in the deposit transaction processing) is mainly explained.
(Deposit Transaction Processing in Automatic Transaction System 200)

The flow of the deposit transaction in the automatic transaction system 200 of this embodiment is now explained with reference to FIG. 25. Here, explained is a case where a magnetic stripe card is used as the card medium 21.

Figure 25:
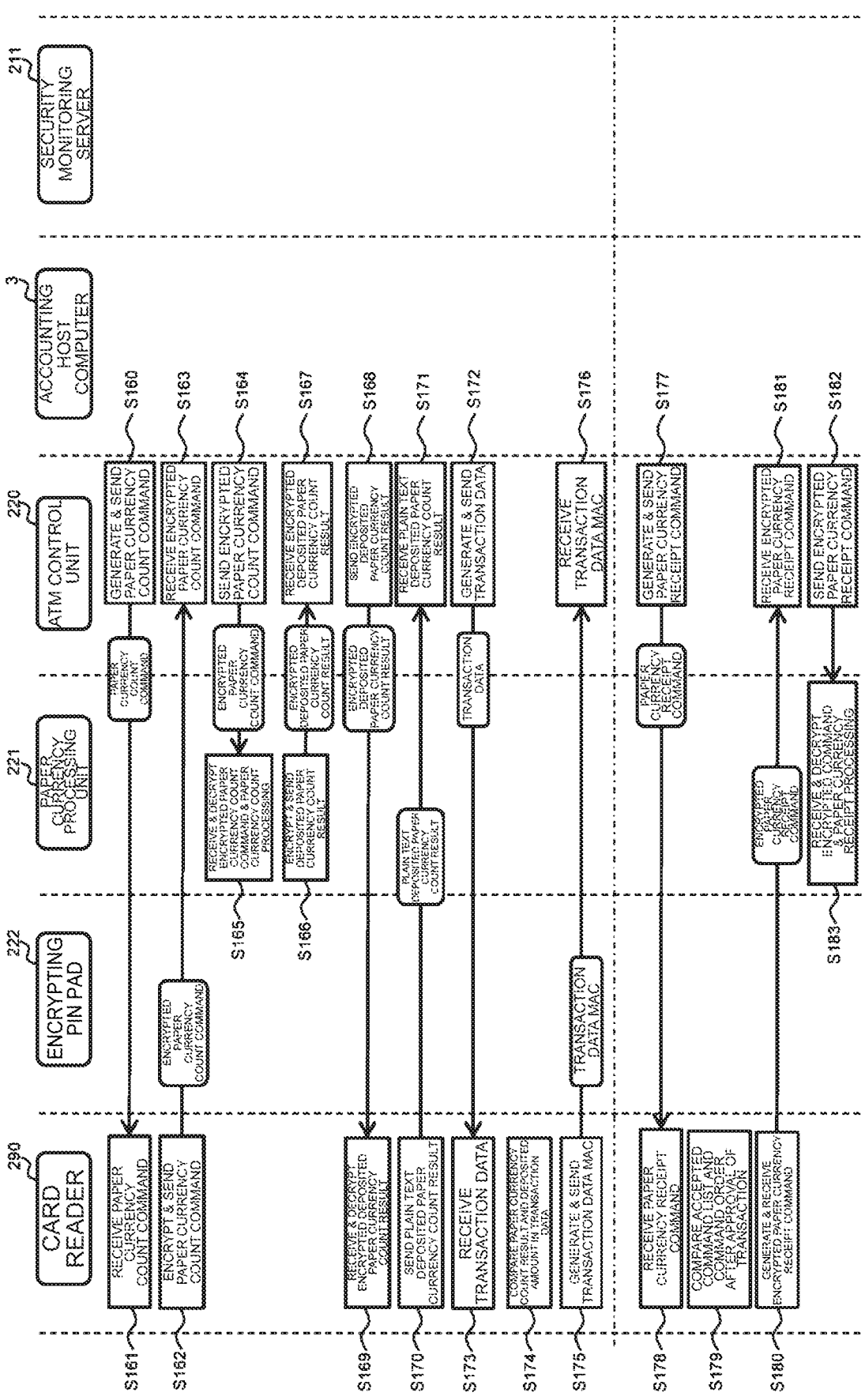
FIG. 25 is a diagram showing a flow of a deposit transaction according to the fourth embodiment.

Note that step S160 to step S176 of FIG. 25 are processing that follow step S1 to step S4 of FIG. 10, and step S6 to step S11 of FIG. 10 have been replaced by step S160 to step S176. Note that, as the flow of the deposition transaction of the second embodiment of FIG. 21, it can be said that step S100 to step S116 have been replaced by step S160 to step S176 of FIG. 25.

Here, as described in the foregoing embodiments, let it be assumed that the sharing of an encryption key has also been concluded in this embodiment. Moreover, let it be assumed that the care number required in step S174 is acquired in step S1 of FIG. 10, and stored as the card medium data 113 of FIG. 23 in the data area 313.

Let it be assumed that the transaction data and the transaction feasibility data required in step S179 are respectively acquired by card reader 290 in step S131 and step S139 of FIG. 24, and stored as the transaction-related data 322 and the transaction feasibility-related data 323 in the data area 313. Furthermore, in step S139, let it be assumed that status data regarding whether the transaction is in a concluded state or a non-concluded state is written into the status table 326 according to the contents of the transaction feasibility data.

Foremost, the ATM control unit 220 generates (the ATM application 40 generates via the paper currency processing unit control software 42) a paper currency count command for counting the total amount of paper currencies placed in the ATM 210, and stores the generated paper currency count command as the command/response data 54 in the data area 33. The ATM control unit 220 sends the stored paper currency count command to the card reader 290 (step S160). When the card reader 290 receives the paper currency count command (step S161), the card reader 290 encrypts the paper currency count command (generates an encrypted paper currency count command), and stores the encrypted paper currency count command as the encryption processing data 321 in the data area 313. Subsequently, the card reader 290 sends the encrypted paper currency count command to the ATM control unit 220 (step S162).

When the ATM control unit 220 receives the encrypted paper currency count command (step S163), the ATM control unit 220 sends the encrypted paper currency count command directly to the paper currency processing unit 221 (step S164). When the paper currency processing unit 221 receives the encrypted paper currency count command sent from the ATM control unit 220, the paper currency processing unit 221 decrypts the encrypted paper currency count command, and performs paper currency count processing (step S165). Note that the counted paper currencies are stored in the temporary cashbox. The paper currency processing unit 221 encrypts the deposited paper currency count result (generates an encrypted deposited paper currency count result), and sends the encrypted deposited paper currency count result to the ATM control unit 220 (step S166). When the ATM control unit 220 receives the encrypted deposited paper currency count result (step S167), the ATM control unit 220 sends the encrypted deposited paper currency count result directly to the card reader 290 (step S168).

When the card reader 290 receives the encrypted deposited paper currency count result, the card reader 290 decrypts the encrypted deposited paper currency count result, and stores the decrypted encrypted deposited paper currency count result as the encryption processing data 321 in the data area 313 (step S169). The stored deposited paper currency count result is used in step S174. Subsequently, the card reader 290 sends the plain text deposited paper currency count result to the ATM control unit 220 (step S170).

Subsequently, the ATM control unit 220 receives the plain text deposited paper currency count result (step S171), generates transaction data by using the card number obtained in step S3 of FIG. 10 and the received plain text deposited paper currency count result, and stores the generated transaction data as the transaction-related data 51 in the data area 33. Subsequently, the ATM control unit 220 sends the transaction data to the card reader 290 for assigning a transaction data MAC to the transaction data (step S172).

When the card reader 290 receives the transaction data (step S173), the card reader 290 compares and verifies whether the card number stored in step S5 of FIG. 10 and the deposited paper currency count result stored in step S109 and the corresponding sections of the transaction data respectively match (step S174). When the card reader 290 determines that they are a match, the card reader 290 generates a transaction data MAC corresponding to the transaction data, and sends the generated transaction data MAC to the ATM control unit 220 (step S175). The ATM control unit 220 receives the sent transaction data MAC (step S176).

Subsequently, step S12 to step S19 of FIG. 10 are executed. However, as described above, in step S139, let it be assumed that the status table 326 stores status data regarding whether the transaction is in a concluded state or a non-concluded state according to the contents of the transaction feasibility data.

When the transaction feasibility data MAC verification result received in step S141 is correct and the transaction feasibility data indicates the conclusion of a transaction, the ATM control unit 220 determines that the transaction has been concluded and generates a paper currency payout command, and sends the generated paper currency payout command to the card reader 290 (step S177). When the card reader 290 receives the paper currency payout command (step S178), the card reader 290 refers to the status table 262, confirms that the deposit transaction has been concluded, compares the command list and the command order that are permitted after the conclusion of the deposit transaction, and confirms that there is no inconsistency (step S179). When the card reader 290 determines that there is no inconsistency, the card reader 290 encrypts the received paper currency receipt command (generates an encrypted paper currency receipt command), and sends the encrypted paper currency receipt command to the ATM control unit 220 (step S180).

When the ATM control unit 220 receives the encrypted paper currency receipt command (step S181), the ATM control unit 220 sends the encrypted paper currency receipt command directly to the paper currency processing unit 221 (step S182). When the paper currency processing unit 221 receives the encrypted paper currency receipt command sent from the ATM control unit 220, the paper currency processing unit 221 decrypts the encrypted paper currency receipt command, and performs paper currency receipt processing of transferring the paper currencies housed in the temporary cashbox to the cashbox (step S183). Note that, when the ATM 210 is not equipped with a temporary cashbox, the processing of step S177 to step S182 is omitted.

In step S179, if malware exists in the ATM control unit 220, let it be assumed that the paper currency return command and the deposit/payout port shutter open command are sent to the card reader 290 as shown in step S36 to step S39 of FIG. 11 in substitute for the paper currency receipt command. In the foregoing case, the card reader 290 refers to the status table 262, determines that there will be an inconsistency when compared with the command list and the command order that are permitted after the conclusion of the deposit transaction, and it is possible to know that an unauthorized command was sent from the malware.

Consequently, in substitute for the card reader 290 executing step S180, the same processing as step S60 to step S73 of FIG. 18 will be executed as with the first embodiment.

Subsequently, step S80 to step S96 of FIG. 20 are executed so that the operator will not fraudulently acquire the paper currencies remaining the temporary cashbox upon restoring the card reader 290 from an abnormal mode to a normal mode.

As described above, with the automatic transaction system 200 of this embodiment, the card reader 290 compares the paper currency deposited amount counted by the paper currency processing unit 221 and the deposited amount included in the transaction data, and, upon determining that they are a match, calculates a transaction data MAC corresponding to the transaction data, and sends the calculated transaction data MAC to the ATM control unit 220.

Thus, according to the automatic transaction system 200, even if the ATM application 40 of the ATM control unit 220 is infected by malware and unauthorized transaction data of an unsubstantiated transaction of the paper currency deposited amount counted by the paper currency processing unit 221 is sent from the ATM control unit 220 to the card reader 290, because this will be inconsistent with the deposited amount included in the transaction data (that is, because the total amount of denomination and number of paper currencies included in the paper currency deposited paper currency count result and the deposited amount included in the transaction data will not be a match), the card reader 290 will not send the transaction data MAC corresponding to the transaction data to the ATM control unit 220. Consequently, the transaction data cannot be sent to the accounting host computer 3 and, therefore, deposit transaction processing based on an unauthorized command will not be performed.

Thus, according to this embodiment, it is possible to realize a highly reliable automatic transaction apparatus in which unauthorized deposit transaction processing is not performed even when device control software such as the ATM application 40, the I/O control unit control software 41 or the paper currency processing unit control software 42 is fraudulently falsified by malware.

Furthermore, with the automatic transaction system 200 of this embodiment, the card reader 290 confirms whether a deposit transaction with the accounting host computer 3 has been concluded, compares it with the command list and the command order that are permitted after the conclusion of the deposit transaction, confirms that there is no inconsistency, and sends the encrypted command. It is thereby possible to realize a highly reliable automatic transaction apparatus in which, even if the paper currency return command and the deposit/payout port shutter open command are sent to the card reader 290 after the deposit transaction is concluded and the user of the ATM 210 walks away, and attempts to open the deposit/payout port shutter and attempts to steal the paper currency, such theft can be prevented.

Furthermore, according to this embodiment, the card reader 290 that is independent from the ATM control unit 220 detects an abnormality of the ATM control unit 220, and notifies the abnormal status of the ATM control unit 220 to the security monitoring server 211. The security monitoring server 211 sends an abnormality countermeasure processing order to the ATM 210 in which an abnormality was notified, and the ATM 210 executes abnormality countermeasure processing based on the received abnormality countermeasure processing order. It is thereby possible to promptly detect an abnormality of the ATM control unit 220 and take measures, and prevent damages caused by fraudulence during a deposit from spreading.

Furthermore, according to this embodiment, even in cases where the malware that entered the ATM control unit 220 obstructs the sending of the abnormal status of the ATM control unit 220 to the security monitoring server 211, or the security monitoring server 211 fails to function properly due to some reason, the card reader 290 that is independent from the ATM control unit 220 is monitoring the time out of a response from the security monitoring server 211 in response to the abnormal status notice. Consequently, when a time out is detected, the card reader 290 performs abnormality countermeasure processing of refusing all commands to the card reader 290 according to the internally retained abnormality countermeasure list. Consequently, it is possible to promptly detect an abnormality of the ATM control unit 220 and the security monitoring server 211 and take measures, and prevent damages caused by fraudulence during a deposit from spreading.

Furthermore, according to this embodiment, even if the card reader 290 enters an abnormality countermeasure mode in a state where paper currencies are remaining in the deposit/payout port, and the abnormality countermeasure mode is cancelled to restore the card reader 290, by setting a proper privileged mode, it is possible to prevent a malicious operator from stealing the paper currencies remaining in the deposit/payout port upon the restoration of the card reader 290, and the restoration operation of a highly reliable automatic transaction apparatus can thereby be performed.

(5) Fifth Embodiment

The fifth embodiment is now explained mainly with reference to FIG. 10, FIG. 23, FIG. 24, FIG. 26, and FIG. 27. Because the configuration of the fifth embodiment is basically the same as the configuration of the third embodiment, the different configuration (specifically, configuration in which the IC card 330, which is one example of the card medium 21, performs the predetermined processing performed by the card reader 290 in the payout transaction processing) is mainly explained.

Figure 26:
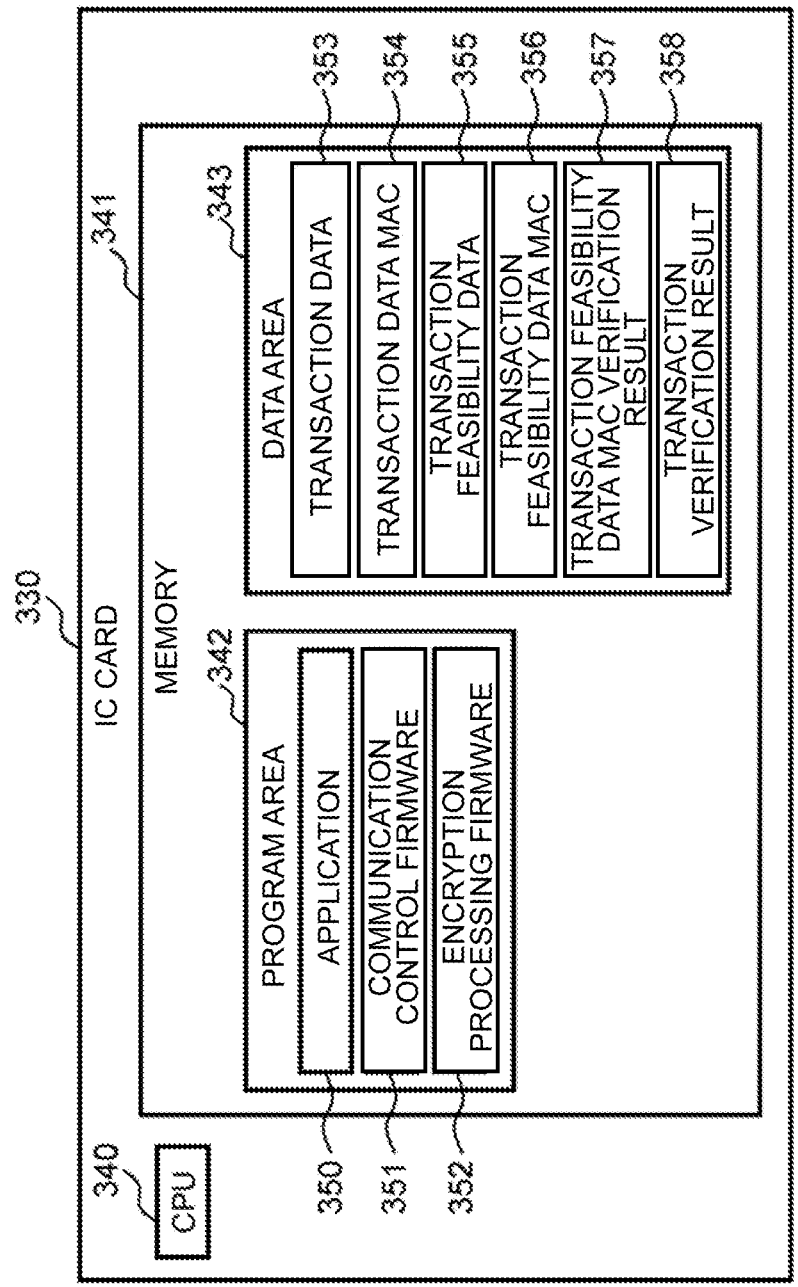
FIG. 26 is a diagram showing a schematic configuration of an IC card according to the fifth embodiment.

FIG. 26 is a diagram showing a schematic configuration of the IC card 330. As shown in FIG. 26, the IC card 330 is configured by comprising information processing resources such as a CPU 340 which governs the operational control of the overall IC card 330, and a memory 341. The storage area of the memory 341 is managed by being divided into a program area 342 and a data area 343. The program area 342 stores an application 350, communication control firmware 351, encryption processing firmware 352 and the like. The data area 343 stores transaction data 353, transaction data MAC 354, transaction feasibility data 355, a transaction feasibility data MAC 356, a transaction feasibility data MAC verification result 357, a transaction verification result 358 and the like.

The application 350 is software which controls the overall IC card 330. The communication control firmware 351 is software with a function of controlling the data communication with the card reader 290. The encryption processing firmware 352 is software with an encryption processing function of generating the transaction data MAC 354 and verifying the transaction feasibility data MAC 356 sent from the accounting host computer 3.

The transaction data 353 is transaction data for a payout transaction or a deposit transaction sent from the ATM 210. The transaction data MAC 354 is a message authentication code generated from the transaction data 353. The transaction data MAC 354 is verified by the accounting host computer 3. The transaction feasibility data 355 is data indicating the determination result on whether the accounting host computer 3 determined that the transaction may be concluded upon referring to the bank account balance and the credit information.

The transaction feasibility data MAC 356 is a message authentication code corresponding to the transaction feasibility data 355 and is generated by the accounting host computer 3. The transaction feasibility data MAC verification result 357 is the same as the data stored in the transaction feasibility-related data 323 of FIG. 23. The transaction verification result 358 is data used by the IC card 330 for determining the paper currency payout feasibility based on the specification of the IC card transaction. For example, the transaction verification result 358 is data used for permitting the sending of the paper currency payout command to the ATM control unit 220 as a result of the IC card 330 verifying the transaction feasibility data MAC 356. Moreover, the transaction verification result 358 is also used by the accounting host computer 3 for verifying that the IC card 330 has verified the transaction data MAC 354 and approved the transaction in the ATM 210. As the transaction verification result 358, "transaction approved data" is generated when the transaction is approved, and "transaction rejected data" is generated when the transaction is denied.

As described above, the IC card 330 stores the bank account number and the credit card number of the holder of the IC card 330 and information for verifying the identity of the holder of the IC card 330, and has a function of generating and verifying a message authentication code required for a transaction in the ATM 210 with the accounting host computer 3.

(Payout Transaction Processing in Automatic Transaction System 200)

Figure 27:
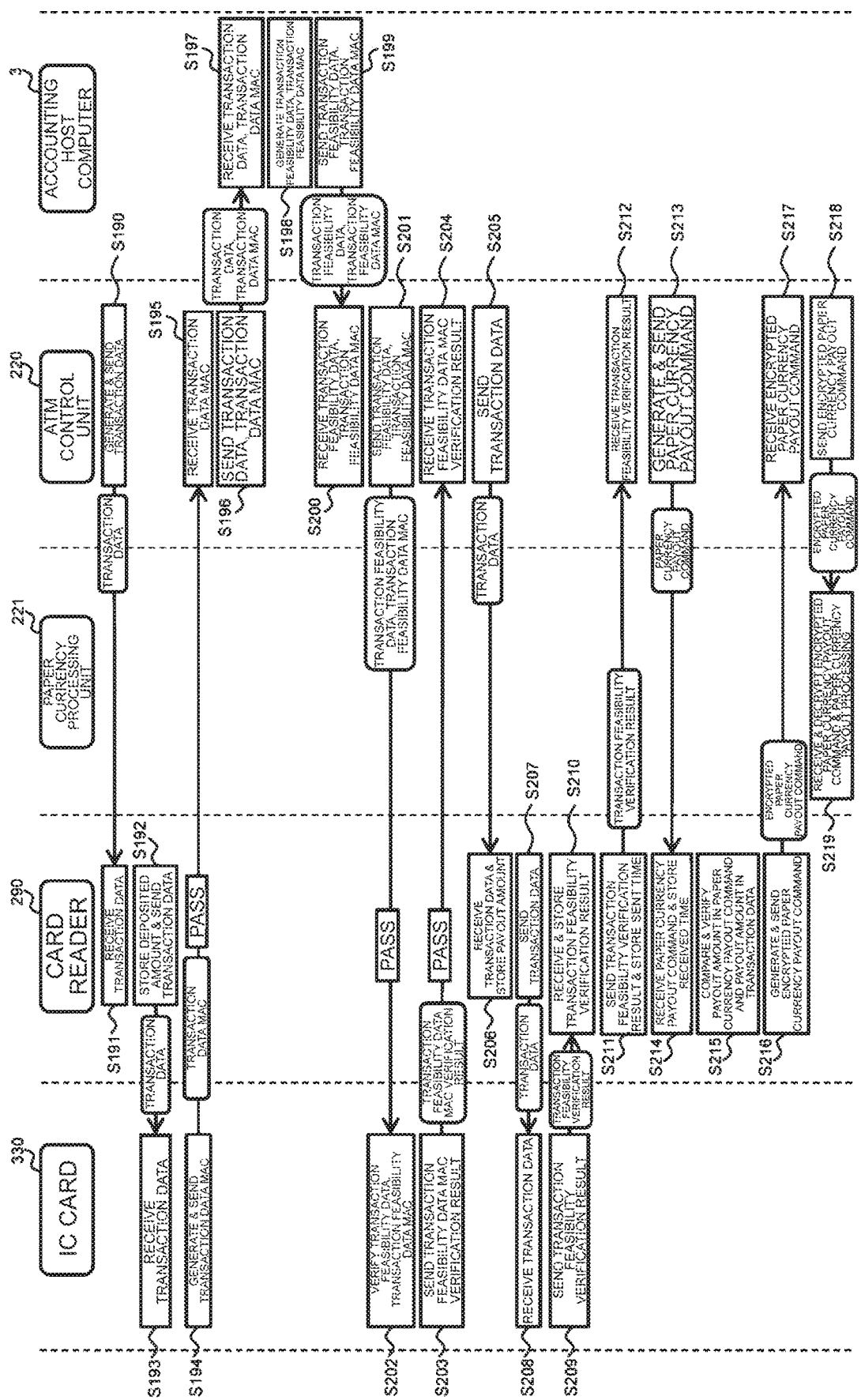
FIG. 27 is a diagram showing a flow of a payout transaction according to the fifth embodiment.

The flow of the payout transaction in the automatic transaction system 200 of this embodiment is now explained with reference to FIG. 27. Here, explained is a case where the IC card 330 is used as the card medium 21. Note that step S190 to step S219 of FIG. 27 are processing that follows step S1 to step S7 of FIG. 10. Here, let it be assumed that the sharing of an encryption key and the generation of a session required for the encrypted communication between the IC card 330 and the paper currency processing unit 221, and between the IC card 330 and the accounting host computer 3, have been completed. Moreover, the exchange of known data required for the encrypted communication, such as challenge data and response data for preventing a replay attack in the encrypted communication, is also omitted.

Foremost, the ATM control unit 220 generates transaction data by using the card number received in step S3 and the payout amount received in step S7, and sends the transaction data to the card reader 290 for assigning a transaction data MAC corresponding to the transaction data (step S190). When the card reader 290 receives the transaction data (step S191), the card reader 290 stores the payout amount included in the transaction data as the transaction-related data 322 in the data area 313, and additionally sends the transaction data to the IC card 330 (step S192).

When the IC card 330 receives the transaction data (step S193), the IC card 330 generates a transaction data MAC corresponding to the transaction data by using an internally retained encryption key, and sends the transaction data as the transaction data MAC to the ATM control unit 220 via the card reader 290 (step S194).

When the ATM control unit 220 receives the transaction data MAC (step S195), the ATM control unit 220 stores the received transaction data MAC as the transaction-related data 51 in the data area 33, and sends the transaction data MAC, together with the previously stored transaction data, to the accounting host computer 3 (step S196). The accounting host computer 3 performs the same processing as step S135 and step S136, and returns the transaction feasibility data of the transaction feasibility-related data 154, and the transaction feasibility data MAC corresponding to the transaction feasibility data, to the ATM control unit 220 (step S199).

When the ATM control unit 220 receives the transaction feasibility data and the transaction feasibility data MAC sent from the host computer 3 (step S200), the ATM control unit 220 stores the transaction feasibility data and the corresponding transaction feasibility data MAC as the transaction feasibility-related data 52 in the data area 33, and sends such data to the card reader 290 (step S201).

When the card reader 290 receives the transaction feasibility data and the transaction feasibility data MAC sent from the ATM control unit 220, the card reader 290 sends the received transaction feasibility data and transaction feasibility data MAC directly to the IC card 330, and, when the IC card 330 receives the transaction feasibility data and the transaction feasibility data MAC, the IC card 330 verifies the transaction feasibility data and the transaction feasibility data MAC (step S202). The IC card 330 sends the result of the verification as the transaction feasibility data MAC verification result to the ATM control unit 220 via the card reader 290 (step S203).

When the ATM control unit 220 receives the transaction feasibility data MAC verification result (step S204), the ATM control unit 220 sends the transaction data once again toward the card reader 290 based on the specification of the IC card transaction (step S205). When the card reader 290 receives the transaction data, the card reader 290 extracts the payout amount from the transaction data, stores the payout amount as the transaction-related data 322 in the data area 313 (step S206), and sends the transaction data toward the IC card 330 (step S207). When the IC card 330 receives the transaction data (step S208), the IC card 330 generates a transaction feasibility verification result and sends the generated transaction feasibility verification result to the card reader 290 (step S209).

When the card reader 290 receives the transaction feasibility verification result, the card reader 290 stores the transaction feasibility verification result as the transaction feasibility-related data 323 in the data area 313, refers to the transaction feasibility verification result, and writes the status data regarding whether the transaction is in a concluded state or a non-concluded state in the status table 326 (step S210). Subsequently, the card reader 290 sends the transaction feasibility verification result to the ATM control unit 220, and stores the transmission time in the time data 325 (step S211). When the ATM control unit 220 receives the transaction feasibility verification result (step S212), and, when the transaction feasibility verification result received in step S212 is correct and the transaction feasibility data indicates the conclusion of a transaction, the ATM control unit 220 determines that the transaction has been concluded and generates a plain text paper currency payout command, and sends the generated paper currency payout command to the card reader 290 (step S213).

When the card reader 290 receives the plain text paper currency payout command, the card reader 290 writes the received time as the time data 325 in the data area 313 (step S214). Subsequently, the card reader 290 compare the transmission time stored in step S211, and the time that the paper currency payout command was received in step S214. When the time difference is within a certain threshold, the card reader 290 determines that the sending of the paper currency payout command has not been obstructed by malware. Subsequently, the card reader 290 refers to the status table 326 and confirms whether the payout transaction is in a concluded state. When the card reader 290 determines that the transaction has been concluded, the card reader 290 compares the payout amount of the transaction data stored in step S192 and the payout amount included in the paper currency payout command (step S215). When the card reader 290 determines that the two amounts are a match, the card reader 290 determines that the paper currency payout command sent from the card reader 290 is a paper currency payout command of a substantiated transaction. When the card reader 290 determines that it is a paper currency payout command of a substantiated transaction, the card reader 290 encrypts a plain text paper currency payout command (generates an encrypted paper currency payout command), and sends the encrypted paper currency payout command to the ATM control unit 220 (step S216).

When the ATM control unit 220 receives the encrypted paper currency payout command (step S217), the ATM control unit 220 sends the encrypted paper currency payout command directly to the paper currency processing unit 221 (step S218). When the paper currency processing unit 221 receives the encrypted paper currency payout command from the ATM control unit 220, the paper currency processing unit 221 decrypts the encrypted paper currency payout command, and performs paper currency payout processing (step S219).

The ATM control unit 220 generates a deposit/payout port shutter open command and sends a plain text paper currency payout command to the card reader 290, but because the subsequent processing is the same as step S149 onward of FIG. 24, the explanation thereof is omitted.

According to this embodiment, the same effects as the third embodiment can be yielded.

(6) Sixth Embodiment

Figure 28:
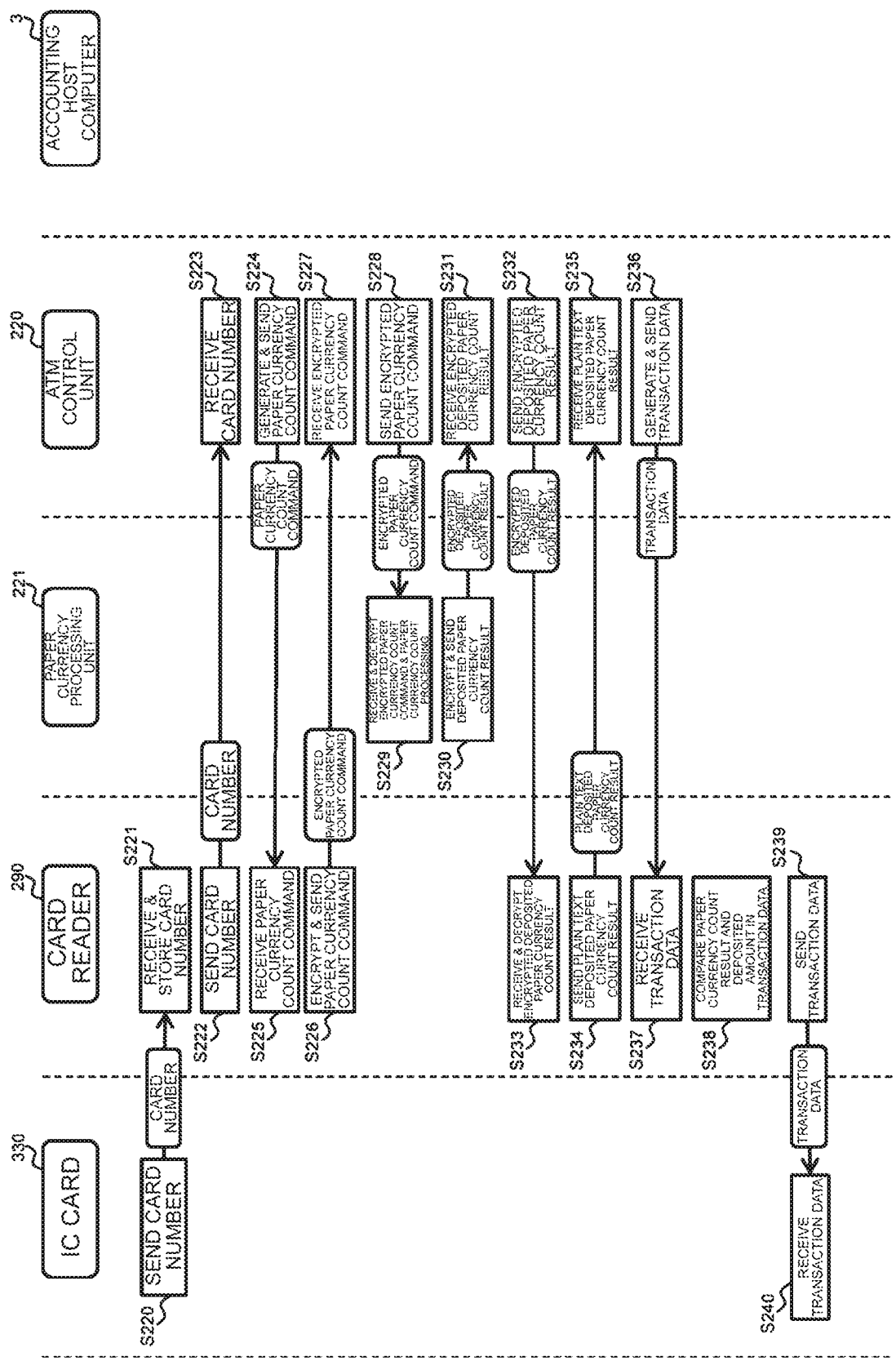
FIG. 28 is a diagram showing a flow of a deposit transaction according to the sixth embodiment.

The sixth embodiment is now explained mainly with reference to FIG. 25, FIG. 27, and FIG. 28. Because the configuration of the sixth embodiment is basically the same as the configuration of the fourth embodiment, the different configuration (specifically, configuration in which the IC card 330, which is one example of the card medium 21, perform the predetermined processing performed by the card reader 290 in the deposit transaction processing) is mainly explained.

(Deposit Transaction Processing in Automatic Transaction System 200)

The flow of the deposit transaction in the automatic transaction system 200 of this embodiment is now explained with reference to FIG. 28. Note that this embodiment explains a case where the IC card 330 is used as the card medium 21. Here, as described in the foregoing embodiments, let it be assumed that the sharing of an encryption key has also been concluded in this embodiment.

Foremost, the card reader 290 reads the card number from the IC card 330, and stores the read card number as the card medium data 113 in the data area 313 (step S221). Subsequently, the card reader 290 sends the card number, which was stored as the card medium data 113 in the data area 313, to the ATM control unit 220 (step S222). The ATM control unit 220 receives the card number, and stores the received card number as the card number 50 in the data area 33 (step S223). Subsequently, the ATM control unit 220 generates a paper currency count command and sends the generated paper currency count command to the card reader 290 (step S224), but because step S224 to step S237 are the same processing as step S160 to step S173 of FIG. 25, the explanation thereof is omitted.

The card reader 290 compares the card number stored in step S221, the deposited paper currency count result stored in step S233, and the corresponding section of the transaction data received in step S237 to determine whether they match (step S238). When the card reader 290 determines that they are a match, the card reader 290 sends the transaction data to the IC card 330 in order to generate a transaction data MAC corresponding to the transaction data (step S239). The IC card 330 receives the transaction data (step S240). Subsequent processing is the same as step S194 to step S212 of FIG. 27. Because the subsequent processing of generating and sending a paper currency receipt command performed by the ATM control unit 220 is the same as the processing of step S177 to step S183 of FIG. 25, the explanation thereof is omitted.

According to this embodiment, the same effects as the fourth embodiment can be yielded.

(7) Other Embodiments

Note that the first to sixth embodiments described above explained a case of applying the present invention to the ATM 210, the present invention is not limited thereto, and can also be broadly applied to various other automatic transaction apparatuses. Otherwise, the present invention can also be applied to a manned (bank teller) cash processing terminal which handles both transaction data and cash.

Moreover, the first to sixth embodiments described above explained a case of equipping existing devices; specifically, the paper currency processing unit 221, the card reader 13, 290, and the encrypting pin pad 222 with the functions of sending commands, and determining whether an electronic signature or a message authentication code may be assigned to the transaction data. Nevertheless, this kind of determination function may also be equipped in an independent device that is newly provided in the ATM 210. In other words, an independent device exists between existing devices such as the paper currency processing unit 221, the card reader 13, 290, and the encrypting pin pad 222, and the ATM control unit 220, commands from the ATM control unit 220 are sent to the independent device, and data is exchanged between existing devices such as the paper currency processing unit 221, the card reader 13, 290, and the encrypting pin pad 222 and the independent device via encrypted communication. Moreover, the sending of data from existing devices such as the paper currency processing unit 221, the card reader 13, 290, and the encrypting pin pad 222 to the ATM control unit 220 is performed via the independent device.

Moreover, while the foregoing first to sixth embodiments illustrated examples of performing encrypted communication among the paper currency processing unit 221, the card reader 13, and the encrypting pin pad 222 and equipping the foregoing determination function, the encrypted communication function and the determination function may also be equipped in the receipt printer 15, the passbook printer 16, a biometric authentication device or other devices to the extent that the generality is not lost.

Moreover, while the foregoing second, fourth and sixth embodiments explained a case a mode including deposit receipt processing, when the paper currency processing unit 221 is not equipped with a temporary cashbox, the paper currency processing unit 221 may house the paper currencies in the cashbox, and not the temporary cashbox, based on the deposited paper currency count, and the ATM control unit 220 may determine that the paper currencies housed in the cashbox should be managed by the bank when the deposit is possible based on the transaction verification result of step S17 (determine that the deposit has been accepted or the deposit has been completed), and may return the paper currencies housed in the cashbox to the user (customer) when the deposit is not possible. In other words, the paper currency processing unit 221 completes the deposit processing without performing paper currency receipt processing of transferring paper currencies from the temporary cashbox to the cashbox.

Moreover, while the foregoing second, fourth and sixth embodiments explained a mode of a deposit transaction, the present invention is not limited thereto, the present invention may also be applied to a mode of a remittance transaction. In the foregoing case, the account information of the payee may be input using the encrypting pin pad 222, and, for example, the account number of the payee may be included in the items to be compared with the transaction data in step S114.

Moreover, while the foregoing first, third and fifth embodiments explained a case of preventing unauthorized payout commands and shutter open commands in payout transactions, the present invention is not limited thereto, the present invention may also be applied to a mode of preventing transactions associated with an unauthorized payout amount as with the case of deposit transactions. In the foregoing case, for instance, the payout amount input from the encrypting pin pad 222 in step S6 may be compared with the payout amount included in the payout transaction data upon generating a payout transaction data MAC in step S10, and the transaction data MAC may be generated when they are a match. It is thereby possible to prevent the conclusion of a payout transaction that is contrary to the intention of the user of the ATM 210.

Moreover, while the foregoing embodiments explained a case of applying the present invention to the existing devices in the ATM 210, the present invention is not limited thereto, and the present invention may also be applied by providing an exclusive device for detecting an abnormality of the ATM 210.

Moreover, while the foregoing embodiments explained a case of one device executing the verification of the amount (step S42 and the like) and the verification of the command (step S49 and the like), the present invention is not limited thereto, and the configuration may also be such that one device executes the verification of the amount and another device executes the verification of the command.

Moreover, while the foregoing embodiments explained a case where, upon detecting an abnormality of the ATM control unit 22, the abnormality is output to the security monitoring server 211 (example of a higher-level device) managed by the ATM 210 as an example of outputting an abnormality of the ATM control unit 220, the present invention is not limited thereto, and the abnormality of the ATM control unit 220 may also be notified to a maintenance worker of the ATM 210 (for example, via email, phone or the like to an information processing device held by the maintenance worker), or an alarm device installed at a predetermined may be activated, or the abnormality may be output based on other methods.

Moreover, while the foregoing embodiments explained a case where the security monitoring server 211 performs processing of extracting measures according to the abnormal status, the present invention is not limited thereto, and the processing of extracting measures according to the abnormal status may also be performed by other devices (encrypting pin pad 222, card reader 290 and the like).

Moreover, in the foregoing embodiments, the ATM 210 may also comprise a hard currency processing unit (not shown) for handling the deposited hard currency and the hard currency to be paid out. The paper currency processing unit 221 and the hard currency processing unit are examples of a deposit/payout processing unit which handles the deposited cash (cash may only be paper currencies, only hard currencies, or both paper currencies and hard currencies), and the cash to be paid out. In addition, the term "paper currency receipt command" may be replaced with "cash receipt command", and the term "paper currency" may be replaced with "cash" in the foregoing embodiments.

Moreover, while the foregoing embodiments explained a case performing the verification by comparing the received time of the paper currency payout command and the received time of the deposit/payout port shutter open command, the present invention is not limited thereto, and the verification may also be executed by comparing the transmission time of the encrypted paper currency payout command and the received time of the deposit/payout port shutter open command. Otherwise, the verification may be executed by comparing the received time of the transaction feasibility data and the received time of the deposit/payout port shutter open command.

Moreover, while the foregoing embodiments explained a case of exchanging data between devices via the ATM control unit 220, the present invention is not limited thereto, and a physical line may be provided between certain or all devices, and data may be directly exchanged between the devices without going through the ATM control unit 220.

Moreover, the configurations of the foregoing embodiments may be suitably combined to an extent in which the subject matter of the present invention is not changed.

While the foregoing embodiments offered an explanation by differentiating the differences in comparison to conventional technologies for the sake of explanation, the present invention may or may not also include a conventional configuration, and the present invention must not be wrongfully interpreted in a limited manner based on the explanation by differentiating the differences in comparison to conventional technologies.

(8) Features of Embodiments

The embodiments described above comprise at least the following features.

An automatic transaction apparatus comprises a first device (card reader, encrypting pin pad or the like) and a second device (for example, the paper currency processing unit), wherein the second device receives a first command and a second command which cause the second device to execute processing from a control unit of the automatic transaction apparatus via the first device, and the first device determines whether the first command and the second command have been received within a predetermined time, and, when the first command and the second command have not been received within a predetermined time, notifies an abnormality.

Moreover, the first device (card reader, encrypting pin pad or the like) sends a first command and a second command which cause a second device (for example, the paper currency processing unit) to execute processing to the second device via a control unit of the automatic transaction apparatus, determines whether the first command and the second command have been received within a predetermined time, and, when the first command and the second command have not been received within a predetermined time, notifies an abnormality.

According to the characteristic configuration described above, even if malware enters the control unit of the automatic transaction apparatus, the first device is able to detect an abnormality.

An automatic transaction apparatus comprises a first device (card reader, encrypting pin pad or the like), wherein, when the first device detects an abnormality, the first device notifies an abnormality to a higher-level device (for example, the security monitoring server), and performs abnormality countermeasure processing (stop processing or the like) when a response is not notified from the higher-level device within a predetermined time.

Moreover, when the first device (card reader, encrypting pin pad or the like) detects an abnormality, the first device notifies the abnormality to the higher-level device (for example, the security monitoring server), and performs abnormality countermeasure processing (stop processing or the like) when a response is not notified from the higher-level device within a predetermined time.

Note that the abnormality countermeasure processing may include processing of issuing a command of performing abnormality countermeasure processing to the second device (for example, the paper currency processing unit).

According to the characteristic configuration described above, even if an abnormality in the higher-level device, it is possible to prevent fraudulent operations to the first device and the second device.

An automatic transaction apparatus comprises a first device (card reader, encrypting pin pad or the like) and a paper currency processing unit, wherein the first device stores transaction data including a payout amount in which transaction feasibility is determined by a server (for example, the accounting host computer), sends the transaction data to a control unit of the automatic transaction apparatus, receives a payout command including information related to the payout amount which is generated by the control unit of the automatic transaction apparatus based on the transaction data, compares the information related to the payout amount included in the transaction data and information related to the payout amount included in the payout command, and, when they are a match, sends a payout command to the paper currency processing unit.

The first device (card reader, encrypting pin pad or the like) stores transaction data including a payout amount in which transaction feasibility is determined by a server (for example, the accounting host computer), sends the transaction data to a control unit of the automatic transaction apparatus, receives a payout command including information related to the payout amount which is generated by the control unit of the automatic transaction apparatus based on the transaction data, compares the information related to the payout amount included in the transaction data and information related to the payout amount included in the payout command, and, when they are a match, sends a payout command to the paper currency processing unit equipped in the automatic transaction apparatus.

According to the characteristic configuration described above, it is possible to prevent an unauthorized payout caused by malware entering the control unit of the automatic transaction apparatus.

An automatic transaction apparatus including a second device, a first device which is different from the second device, and a control unit which is connected to the second device and the first device, wherein the control unit generates a command for operating the second device and sends the generated command to the first device, and the first device determines the feasibility of processing related to the command. The first device can detect an abnormality even when malware enters the control unit of the automatic transaction apparatus equipped with a plurality of devices.

Moreover, with an automatic transaction apparatus including a paper currency processing unit which processes paper currencies, a first device which is different from the paper currency processing unit, and a control unit which is connected to the paper currency processing unit and the first device, the control unit generates a command for operating the paper currency processing unit and sends the generated command to the first device, and the first device determines the feasibility of processing related to the command. By sending the command to the first device and determining the operation feasibility of the paper currency processing unit with the first device other than the paper currency processing unit, even if the control unit encounters an abnormality, it is possible to detect the falsification of the command for operating the paper currency processing unit.

In particular, the first device may also compare the transaction information input from the outside of the automatic transaction apparatus or the transaction information that was authenticated by the server, and the transaction information included in the command generated by the control unit or the transaction information included in the result of operating the second device (for example, the paper currency processing unit) based on the command generated by the control unit. Moreover, communication between the paper currency processing unit and the first device may also be encrypted. According to this configuration, the security can be further increased.

An automatic transaction apparatus (for example, the ATM 210) comprises a control unit (for example, the ATM control unit 220) which generates transaction data related to a transaction and generates a command for payout, deposit or remittance based on the transaction data, and a first device (for example, the encrypting pin pad 222) comprising a first input unit (for example, the communication control firmware 131) which inputs information from a device (card reader 13, card reader 290 or the like) that is different from the control unit and a second input unit (for example, a numeric keypad) which can be used by a user for inputting information to the automatic transaction apparatus, wherein the first device detects an abnormality of the control unit based on a command sent from the control unit according to an input of one or both of the first input unit and the second input unit, and, upon detecting an abnormality, externally outputs the abnormality of the control unit.

More detailed features depending on the type of transaction and in the respective steps are explained below.

For example, the present invention may also have the following features (for instance, step S42 of FIG. 18). With an automatic transaction apparatus including a paper currency processing unit, a first device that is different from the paper currency processing unit, and a control unit which is connected to the paper currency processing unit and the first device, the control unit generates a payout command for causing the paper currency processing unit to perform payout processing, and the first device determines that the payout processing may be implemented by the paper currency processing unit when it is confirmed that the transaction information included in the payout command and the transaction information input by the user from the outside of the automatic transaction apparatus are a match. Based on the foregoing configuration, it is possible to increase the security of the payout transaction. In particular, when the paper currency processing unit verifies the transaction information (determines whether the payout command should be executed), because the payout command and the deposit/payout port shutter open command can be sent to the first device and verified, it is possible to detect the obstruction in sending the command to the paper currency processing unit, and prevent attacks on a more broader level. For example, it is possible to prevent the attack of sending a deposit/payout port shutter open command after the ATM user walks away from the ATM, and fraudulently acquiring the paper currencies remaining in the deposit/payout port.

Moreover, for instance, the present invention may also have the following features (for instance, step S49 of FIG. 18). With an automatic transaction apparatus which includes a second device (for example, the paper currency processing unit), a first device which is different from the second device, and a control unit which is connected to the second device and the first device, the control unit generates a first command for causing the second device to perform a first operation and a second command for causing the second device to perform a second operation, sends the first command and the second command to the second device via the first device, and the first device detects the existence of an abnormality based on the difference between the first time information that the first command was received and the second time information that the second command was received. More specifically, the first device determines that there is an abnormality in the control unit or the automatic transaction apparatus when the difference between the first time and the second time is greater than a predetermined time. It is thereby possible to detect a fraudulent command of operating the second device based on malware.

Moreover, for instance, the present invention may also have the following features (for instance, step S60 of FIG. 19). With an automatic transaction apparatus including a paper currency processing unit, a first device that is different from the paper currency processing unit, and a control unit which is connected to the paper currency processing unit and the first device, when the first device detects an abnormality of the control unit, the first device performs abnormality notification processing of notifying the abnormality to a higher-level device connected to the control unit, and, when there is no response from the higher-level device within a predetermined time, the first device performs abnormality countermeasure processing. The first device or the paper currency processing unit may prevent processing based on the command as the abnormality countermeasure processing, or implement the shutdown of devices such as the first device, the paper currency processing unit, the control unit, or the automatic transaction apparatus. It is thereby possible to prevent fraudulent operations to devices even when the higher-level device is subject to an abnormality.

Moreover, for instance, the present invention may also have the following features (for instance, step S114 of FIG. 21). With an automatic transaction apparatus including a paper currency processing unit, a first device which is different from the paper currency processing unit, and a control unit which is connected to the paper currency processing unit and the first device, the control unit generates a deposited paper currency count command for causing the paper currency processing unit to perform deposited paper currency count processing, the first device receives transaction information as information of the paper currencies counted by the paper currency processing unit based on the deposited paper currency count command, and, when it is confirmed that the transaction information as information of the counted paper currency and the transaction information input by the user from outside the automatic transaction apparatus are a match, the first device determines that the deposited paper currencies may be received. Based on the foregoing configuration, it is possible to increase the security of deposit transactions. In particular, in comparison to the case of verifying the transaction information with the paper currency processing unit, as a result of the first device verifying the transaction information and sending a command to the paper currency processing unit, and detecting an attack against the sending of a command, such as delaying the sending of a command, it is possible to prevent the return of unauthorized paper currencies. Moreover, while the foregoing embodiments were explained using a command for transferring paper currencies for receiving the deposited paper currencies, but this command may also be a command of determining the counted paper currencies as the paper currencies of the paper currency processing unit without having to transfer the paper currencies.

Moreover, for instance, the present invention may also have the following features (for instance, step S114 of FIG. 21). With an automatic transaction apparatus which includes a second device (for example, the paper currency processing unit), a first device which is different from the second device, and a control unit which is connected to the second device and the first device, the first device receives information (card number, account number or the like) related to the payee generated by the control unit, and determines that deposit is possible when it is confirmed that the information related to the payee generated by the control unit and the information related to the payee input by the user from the outside of the automatic transaction apparatus.

Moreover, for instance, the present invention may also have the following features (for instance, step S119 of FIG. 21). With an automatic transaction apparatus which includes a second device (for example, the paper currency processing unit), a first device which is different from the second device, and a control unit which is connected to the second device and the first device, the control unit generates a plurality of commands for causing the second device to execute processing and sends the plurality of commands to the first device, and the first device executes abnormality countermeasure processing when the plurality of commands are not in a predetermined order or not of predetermined contents.

REFERENCE SIGNS LIST

3 . . . accounting host computer, 13, 290 . . . card reader, 21 . . . card medium, 200 . . . automatic transaction system, 210 . . . ATM, 211 . . . security monitoring server, 220 . . . ATM control unit, 221 . . . paper currency processing unit, 222 encrypting pin pad.

The invention claimed is:

1. An automatic transaction apparatus, comprising: a control unit which generates transaction data related to a transaction, and generates a command for payout, deposit or remittance based on the transaction data; and a first device which detects an abnormality of the control unit based on a command sent from the control unit according to an input from a device that is different from the control unit, wherein the first device sends the command to a second device that is different from the first device when the first device determines that an abnormality of the control unit is not detected based on a command sent from the control unit; wherein, after confirming that the deposit transaction has been concluded, the detection device detects an abnormality of the controller based on the command sent from the controller and a prescribed command which is permitted after the conclusion of the deposit transaction.

2. An automatic transaction apparatus, comprising:
a controller configured to generate a command for payout or deposit based on transaction data related to a transaction;
a deposit/payout processor configured to perform processing of payout or deposit based on a command generated by the controller; and
a detection device configured to detect an abnormality of the controller, wherein, after a transaction is concluded, the controller generates a command for instructing the deposit/payout processor to perform processing of the transaction, and sends the command to the detection device,
wherein, after confirming that the deposit transaction has been concluded, the detection device detects an abnormality of the controller based on the command sent from the controller and a prescribed command which is permitted after the conclusion of the deposit transaction, and wherein the detection device outputs an abnormality of the controller upon detecting the abnormality of the controller based on the command.

3. The automatic transaction apparatus according to claim 2, wherein the controller generates a first command for instructing payout including amount information indicating a payout amount and sends the first command to the detection device, and thereafter generates a second command for opening a shutter of a deposit/payout port for removing cash and sends the second command to the detection device, and wherein the detection device detects an abnormality of the controller based on whether a difference between a received time of the first command and a received time of the second command exceeds a threshold.

4. The automatic transaction apparatus according to claim 3, wherein the detection device includes an encrypting pin pad, wherein, when a difference between a received time of the first command and a received time of the second command is within a threshold, the encrypting pin pad determines that the controller is operating normally, encrypts the second command, and sends the encrypted second command to the controller, wherein the controller sends the encrypted second command to the deposit/payout processor, and wherein the deposit/payout processor performs processing for decrypting the encrypted second command, and opening the shutter of the deposit/payout port.

5. The automatic transaction apparatus according to claim 3, wherein the detection device includes a card reader, wherein, when a difference between a received time of the first command and a received time of the second command is within a threshold, the card reader determines that the controller is operating normally, encrypts the second command, and sends the encrypted second command to the controller, wherein the controller sends the encrypted second command to the deposit/payout processor, and wherein the deposit/payout processor performs processing for decrypting the encrypted second command, and opening the shutter of the deposit/payout port.

6. The automatic transaction apparatus according to claim 2, wherein the detection device includes an encrypting pin pad, wherein, after confirming that a deposit transaction has been concluded and subsequently receiving a cash receipt command from the controller, the encrypting pin pad determines that the controller is operating normally, encrypts the cash receipt command, and sends the encrypted cash receipt command to the controller, wherein the controller sends the encrypted cash receipt command to the deposit/payout processor, and wherein the deposit/payout processor performs processing for decrypting the encrypted cash receipt command, and receiving cash.

7. The automatic transaction apparatus according to claim 2, wherein the detection device includes a card reader, wherein, after confirming that a deposit transaction has been concluded and subsequently receiving a cash receipt command from the controller, the card reader determines that the controller is operating normally, encrypts the cash receipt command, and sends the encrypted cash receipt command to the controller, wherein the controller sends the encrypted cash receipt command to the deposit/payout processor, and wherein the deposit/payout processor performs processing for decrypting the encrypted cash receipt command, and receiving cash.

8. The automatic transaction apparatus according to claim 2, wherein, upon detecting an abnormality of the controller, the detection device outputs the abnormality of the controller to a higher-level device which is managing the automatic transaction apparatus, and, if a response from the higher-level device is not received within a predetermined time, performs prescribed abnormality countermeasure processing.

9. An automatic transaction apparatus, comprising: a control unit which generates a command for payout or deposit based on transaction data related to a transaction; a deposit/payout processing unit which performs processing of payout or deposit based on a command generated by the control unit; and a device which is capable of detecting an abnormality of the control unit, wherein, after a transaction is concluded, the control unit generates a command for instructing the deposit/payout processing unit to perform processing of the transaction, and sends the command to the device; wherein, after confirming that the deposit transaction has been concluded, the detection device detects an abnormality of the controller based on the command sent from the controller and a prescribed command which is permitted after the conclusion of the deposit transaction and wherein the device performs prescribed abnormality countermeasure processing upon detecting an abnormality of the control unit based on the command.

10. The automatic transaction apparatus according to claim 9, wherein the control unit sends transaction data including amount information indicating a payout amount to the device, and, after a transaction is concluded, sends a payout command to the device instructing a payout, and wherein the device detects an abnormality of the control unit when a payout amount of the transaction data and a payout amount of the payout command do not match.

11. The automatic transaction apparatus according to claim 10, wherein the device includes an encrypting pin pad, wherein the encrypting pin pad determines that the control unit is operating normally when a payout amount of the transaction data and a payout amount of the payout command are a match, encrypts the payout command, and sends the encrypted payout command to the control unit, wherein the control unit sends the encrypted payout command to the deposit/payout processing unit, and wherein the deposit/payout processing unit performs processing of decrypting the encrypted payout command, and paying out the payout amount.

12. The automatic transaction apparatus according to claim 10, wherein the device includes a card reader, wherein the card reader determines that the control unit is operating normally when a payout amount of the transaction data and a payout amount of the payout command are a match, encrypts the payout command, and sends the encrypted payout command to the control unit, wherein the control unit sends the encrypted payout command to the deposit/payout processing unit, and wherein the deposit/payout processing unit performs processing of decrypting the encrypted payout command, and paying out the payout amount.

13. The automatic transaction apparatus according to claim 9, wherein the device detects an abnormality of the control unit when a deposited amount of a count result of cash counted by the deposit/payout processing unit and a deposited amount of the transaction data generated by the control unit do not match.

14. The automatic transaction apparatus according to claim 13, wherein the device includes an encrypting pin pad, wherein the deposit/payout processing unit encrypts the count result of counting cash and sends the encrypted count result to the control unit, wherein the control unit sends the encrypted count result to the encrypting pin pad, wherein the encrypting pin pad decrypts the encrypted count result and sends the count result to the control unit, wherein the control unit generates transaction data based on the count result, and sends the transaction data to the encrypting pin pad, and wherein the encrypting pin pad detects an abnormality of the control unit when a deposited amount of the count result and a deposited amount of the transaction data do not match.

15. The automatic transaction apparatus according to claim 13, wherein the device includes a card reader, wherein the deposit/payout processing unit encrypts a count result of counting cash and sends the count result to the control unit, wherein the control unit sends the encrypted count result to the card reader, wherein the card reader decrypts the encrypted count result, and sends the count result to the control unit, wherein the control unit generates transaction data based on the count result and sends the transaction data to the card reader, and wherein the card reader detects an abnormality of the control unit when a deposited amount of the count result and a deposited amount of the transaction data do not match.

16. An automatic transaction apparatus, comprising: a control unit which generates transaction data related to a transaction, and generates a command for payout, deposit or remittance based on the transaction data; and a first device which includes a first input unit for inputting information from a device that is different from the control unit and a second input unit which can be used by a user for inputting information to the automatic transaction apparatus, wherein the first device detects an abnormality of the control unit based on a command sent from the control unit according to an input of one or both of the first input unit and the second input unit, and, upon detecting an abnormality, externally outputs the abnormality of the control unit; wherein, after confirming that the deposit transaction has been concluded, the detection device detects an abnormality of the controller based on the command sent from the controller and a prescribed command which is permitted after the conclusion of the deposit transaction.

* * * * *